United States Patent [19]
Lomasney et al.

[11] Patent Number: 5,489,370
[45] Date of Patent: Feb. 6, 1996

[54] REMOVAL OF IONS FROM A BULK SOURCE BY ELECTROPOTENTIAL ION TRANSPORT USING A HOST RECEPTOR MATRIX

[75] Inventors: Henry L. Lomasney; Richard A. Graves, both of New Orleans, La.

[73] Assignee: Ionex, New Orleans, La.

[21] Appl. No.: 173,928

[22] Filed: Dec. 28, 1993

Related U.S. Application Data

[63] Continuation of Ser. No. 822,959, Jan. 21, 1992, abandoned, which is a continuation-in-part of Ser. No. 683,973, Apr. 8, 1991, Pat. No. 5,262,024, which is a continuation-in-part of Ser. No. 550,831, Jul. 11, 1990, abandoned, which is a continuation-in-part of Ser. No. 383,045, Jul. 21, 1989, abandoned, which is a continuation-in-part of Ser. No. 348,525, May 8, 1989, Pat. No. 5,091,447.

[51] Int. Cl.$^6$ .................. C02F 1/46; C02F 1/469; G21F 9/04; G21F 9/16
[52] U.S. Cl. .................. 204/627; 204/280; 204/640; 204/647
[58] Field of Search .................. 204/280, 301, 204/140, 141.5, 149, 151, 180.1, 182.8, 299 R, 302, 182.3, 182.4, 182.5, 130

[56] References Cited

U.S. PATENT DOCUMENTS

| | | | |
|---|---|---|---|
| 2,739,934 | 3/1956 | Kunin | 204/1.5 |
| 2,800,445 | 7/1957 | Clarke | 204/182.4 |
| 2,832,728 | 4/1958 | Kunin | 204/1.5 |
| 2,957,206 | 10/1960 | Mindick et al. | 264/53 |
| 3,647,086 | 3/1972 | Mizutani et al. | 210/500.38 |
| 3,728,238 | 4/1973 | Tarjanyi et al. | 204/149 |
| 3,766,034 | 10/1973 | Veltman | 204/149 |
| 3,790,461 | 2/1974 | Yeh | 204/149 |
| 3,804,733 | 4/1974 | Bennion et al. | 204/130 X |
| 3,808,305 | 4/1974 | Gregor | 204/331.12 |
| 3,988,225 | 10/1976 | Schulze | 204/130 |
| 4,004,994 | 1/1977 | Andrus | 204/130 X |
| 4,188,266 | 2/1980 | Forman | 204/1.11 |
| 4,234,393 | 11/1980 | Hepworth et al. | 204/1.5 |
| 4,338,215 | 7/1982 | Shaffer et al. | 588/1.5 |
| 4,400,250 | 8/1983 | Fairhurst | 204/151 X |
| 4,445,990 | 5/1984 | Kim et al. | 204/149 X |
| 4,474,688 | 10/1984 | Castle et al. | 588/8 |
| 4,512,855 | 4/1985 | Mazur | 204/130 X |
| 4,632,847 | 12/1986 | Lomasney et al. | 588/249 |
| 4,702,804 | 10/1987 | Mazur et al. | 204/151 X |
| 4,792,385 | 12/1988 | Snyder et al. | 204/140 |
| 4,853,040 | 8/1989 | Mazur et al. | 134/2 |
| 5,074,986 | 12/1991 | Probstein et al. | 204/130 |
| 5,098,538 | 3/1992 | Kim et al. | 204/182.2 |
| 5,110,364 | 5/1992 | Mazur et al. | 134/2 |
| 5,137,608 | 8/1992 | Acar et al. | 204/130 |
| 5,190,628 | 3/1993 | Bibler | 204/182.4 |
| 5,240,570 | 8/1993 | Chang et al. | 204/130 |
| 5,326,439 | 7/1994 | Brewster | 204/149 |

FOREIGN PATENT DOCUMENTS 9015659 12/1990 WIPO.

*Primary Examiner*—John Niebling
*Assistant Examiner*—John S. Starsiak, Jr.
*Attorney, Agent, or Firm*—Foley & Lardner

[57] ABSTRACT

Remediation of soil and groundwater using electropotential gradient induced migration of a target ion and immobilization and/or confinement of the target ion by a host receptor matrix (HRM). In addition to immobilizing and/or confining the target ion, the HRM can comprise a buffer or an ionizable species which releases an exchange ion during application of the electropotential gradient. The exchange ion, when less mobile than a ($H^+$) ion or hydroxyl ($OH^-$) ion, increases the efficiency of energy usage during decontamination. The exchange ion can also perform other tasks in the vicinity of the electrodes which improve the decontamination process. The host receptor matrix also can comprise a material which is water impermeable and which has a low surface energy, such as a layer of polytetrafluoroethylene film. When such a material is used, the host receptor matrix can comprise a receptacle in which there is a liquid and/or solid composition which immobilizes and/or contains the target ion.

15 Claims, 11 Drawing Sheets

$I_C = I_{Co} + I_{HO^-} + I_{H^+}$

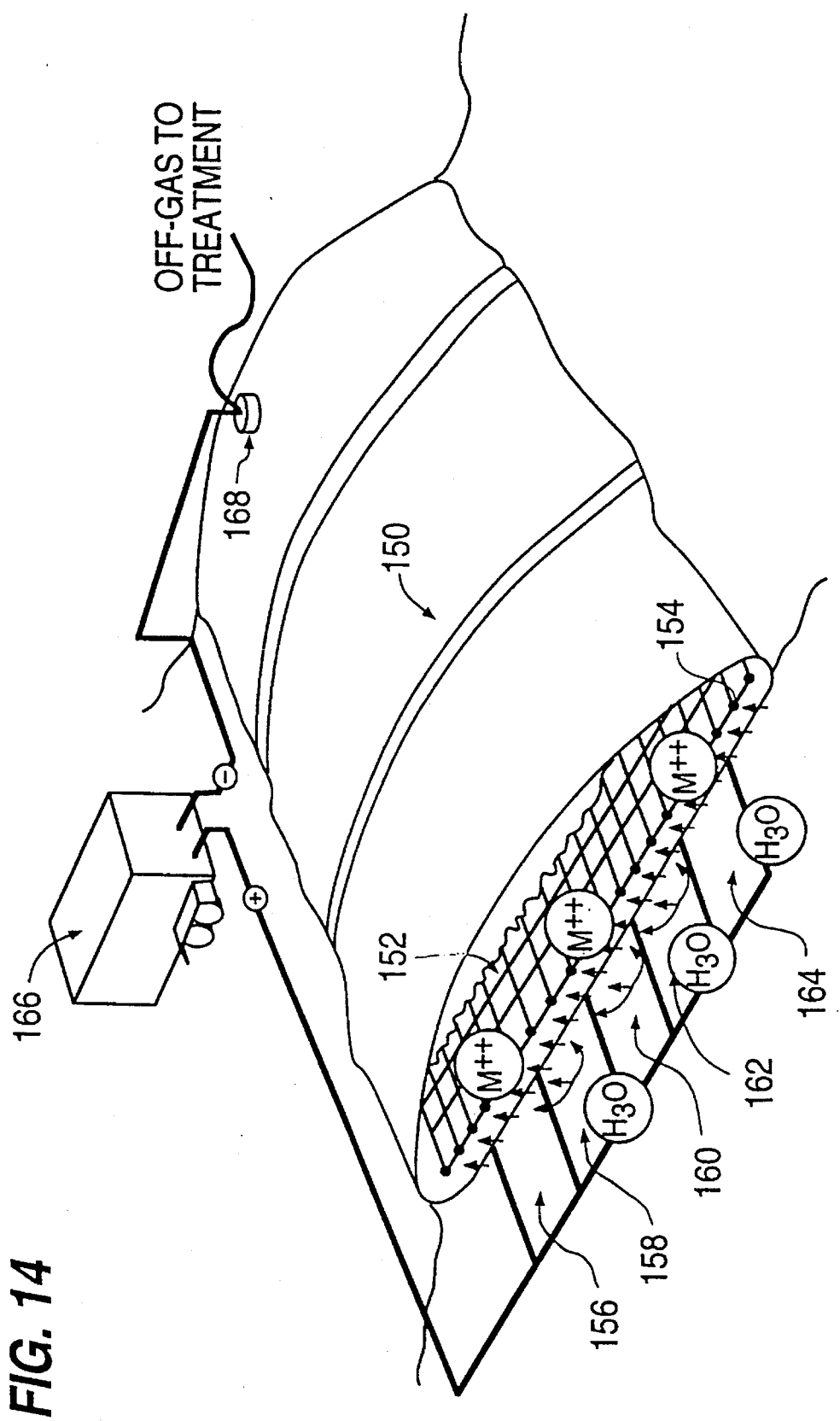

FIG. 15A
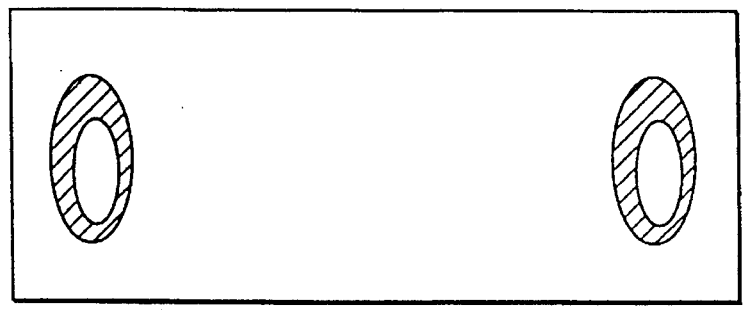
FIG. 15B
FIG. 15C
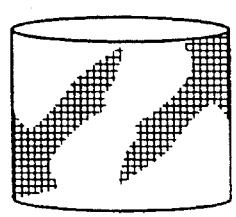
FIG. 17A
$$2H_2O \rightarrow 4H^+ + 4e^- + O_2 \quad \text{ANODE REACTION}$$
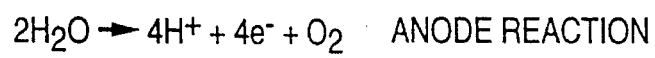
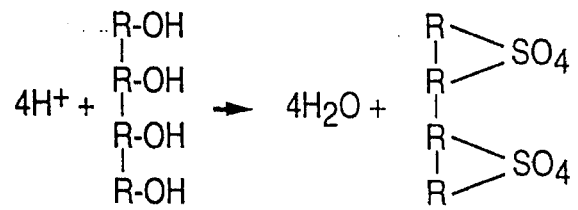
ION EXCHANGE RESIN
FIG. 17B
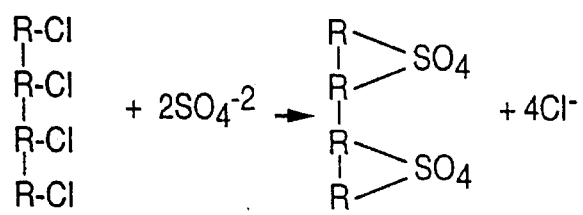
$$4Cl^- \rightarrow 2Cl_2 \quad \text{ALTERNATE REACTION}$$

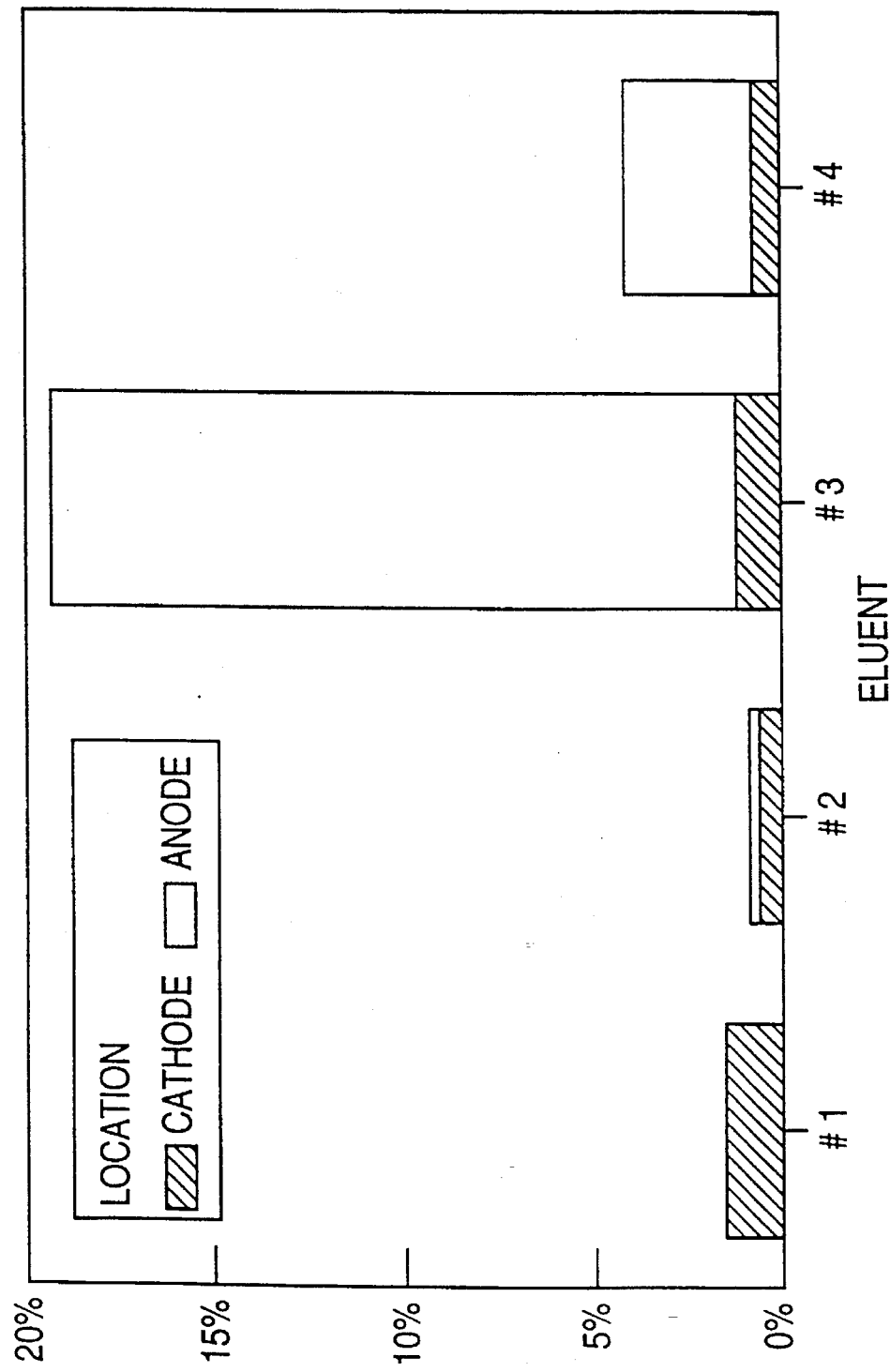

REMOVAL OF IONS FROM A BULK SOURCE BY ELECTROPOTENTIAL ION TRANSPORT USING A HOST RECEPTOR MATRIX

CROSS REFERENCE TO RELATED APPLICATIONS

This application is a continuation of application Ser. No. 07/822,959, filed Jan. 21, 1992 (now abandoned) which is a continuation in part of Ser. No. 07/683,973, filed Apr. 8, 1991, (now U.S. Pat. No. 5,262,024), which is a continuation in part of Ser. No. 07/550,831, filed Jul. 11, 1990, (now abandoned) which is a continuation in part of Ser. No. 07/383,045, filed Jul. 21, 1989 (now abandoned), which is a continuation in part of Ser. No. 07/348,525, filed May 8, 1989 (now U.S. Pat. No. 5,091,447).

FIELD OF THE INVENTION

The present invention relates to processes and apparatuses for removing ions such as radionuclides or heavy metals from bulk sources such as soils and aqueous media. More specifically, the processes and apparatuses of this invention utilize an electropotential gradient to effect migration of the ions into a device for collecting same.

BACKGROUND OF THE INVENTION

The contamination of soil, aquifers and vegetation by ionic materials such as radionuclides and/or heavy metals has been a problem for decades. The danger, of course, is that humans and animals can be poisoned either directly or through the food chain. Our earlier-filed PCT Application U.S. Ser. No. 90/03997, published on 7 Feb. 1991 as WO 91/01392 ("the '1392 application"), presented several new processes and apparatuses for decontaminating a bulk source such as soil or groundwater.

Inter alia, that application introduced the basic process in which an electropotential gradient is applied, via two or more electrodes, to a bulk source containing target ions. The electropotential drives the target ions into an ion permeable host receptor matrix located between the electrodes. Upon reaching the host receptor matrix, the ions are immobilized and/or confined within the matrix, thereby permitting removal of the ions along with the host receptor matrix.

Subsequent research by the present inventors identified additional methods which are especially useful for mobilizing ions such as radionuclides which tightly adsorb to soil clays. (As described below, soil clays can present a particularly tough impediment for decontamination.) Those methods are described in copending U.S. application Ser. No. 07/683,973, filed Apr. 8, 1991. That application describes methods which use wave energy (e.g., microwaves, radio waves, sonic and ultrasonic waves, etc.) to effect or enhance the dissociation of ionic species from a soil matrix.

It is against this background that the inventions described herein are brought, in an effort to improve upon, and refine, the processes and apparatuses described in those earlier applications.

The '1392 application provides an extensive history of prior attempts at soil and groundwater decontamination, which will not be repeated here. For convenience, however, a brief review of such prior attempts, as well as some of the problems which spurred the developments described herein, are discussed in the following sections.

A. SOIL DECONTAMINATION METHODS

Prior attempts to decontaminate soil have variously included: (1) excavating the contaminated soil and processing it to remove the target ions; (2) providing an impervious covering over the ion contaminated regions, which essentially immobilizes the ion by preventing the intrusion of the groundwater necessary for ion mobility; (3) vitrifying the entire soil strata in-situ by adding a "frit" to the soil and establishing an intense electrical field which turns the soil into a glass-like mass which prevents leaching of the ion; (4) injecting a polymerizable monomer or ion exchange gel into the soil; (5) washing the soil with surfactant chemicals and/or pH adjusters to remove soil contaminants, and returning the cleansed soil; (6) excavating contaminated soil for burial at a remote site; (7) burying the contamination by deep plowing using special machinery; (8) changing the land usage; and (10) thermally processing the soil, e.g., through calcination or incineration.

In Chemistry and Industry, 18 Sep. 1989, pp. 585–590, Lageman et al. describe another variation of the in-situ treatment which involves an electrokinetic process. This method utilizes electrodes imbedded in the soil. The electrodes are accompanied by a chemical solution circulation system which circulates the chemical solution needed to minimize the electrode effects. The solution provides a mechanism for transporting the extracted contaminants to a central processing station. The concern for migration of chemical solution into the soil or groundwater is not adequately addressed by this process.

The foregoing methods, however, are regarded as only marginally effective in achieving their goal, namely the return of contaminated land to its original use.

B. GROUNDWATER DECONTAMINATION

Decontaminating groundwater can be extremely difficult. In some cases of contaminated underground aquifers, remediation is so impractical that the only economical solution involves identifying and isolating the source of contamination, and then delaying human contact until natural diffusion of water through the aquifer can provide for dilution of the contaminant.

In other instances, groundwater is treated with conventional ion exchange media, and/or charcoal absorber beds. Yet another option involves in-situ treatment in which chemicals are introduced which react with the ionic contaminants to form insoluble precipitates.

C. DECONTAMINATING RADIOACTIVE SOILS AND CLAYS

In the past, cesium contaminated soils have posed a major obstacle to soil cleanup programs. The difficulty relates to the low mobility of heavy metals such as cesium and plutonium in soil. It has been shown that clays provide the repository for deposited cesium. For example, Gale et al. in 1964 showed that 70% of the total cesium was within the 13% clay fraction of a sandy loam. Lomenick and Tamira in 1965 made measurements of lake sediments and concluded that 84% of the cesium was associated with the 35% clay fraction. Also, it has been found that interleaved mica, which is a constituent of this sediment, was the receptor for the cesium.

The significance of the above conclusion becomes apparent when considering that the cage structure of muscovite mica, which is a component of soil clays, is very similar to that of the zeolite, chabazite. Soil clays are present in a percentage ranging from 10–25 percent in virtually every fertile soil in the world.

Heretofore, removing such heavy radioactive species from the soils has been so difficult as to be considered impracticable. The reasons for this difficulty lie in the atomic characteristics of these heavy metals, especially in their ionic state ("M+"). Generally, the larger the M+ ion, the more numerous are its insoluble salts. One of the important properties of heavy metal ions is their tendency to become bound in a zeolite in insoluble form.

This phenomenon involves a cage-like ion trap found in zeolites, which is responsible for the zeolites often being referred to as an ion sponge or ion exchanger. An example is the cesium ion (Cs+) which is routinely encountered in radioactive form when dealing with fission-type nuclear power or nuclear weapons. The crystal radius of this cesium ion is 3.4 angstroms and the hydrated radius is 6.6 angstroms. The hydrated radius being the radius the cluster that consists of the ion and the water molecules which surround it. The zeolite mineral of the chabazite class has receptor sites whose pore size ranges from 3–7 angstroms which is such that the cesium (without its hydration layer) will fit nearly perfectly into this "host-cage structure". By comparison, a smaller ion (sodium for example) would tend to be more weakly bound in the cage, and upon the arrival of a cesium ion, would be easily displaced.

D. DECONTAMINATION USING ION EXCHANGE

Many of the currently employed methods for decontamination of water and soils involve some form of diffusion-controlled ion exchange.

For example, one of the world's largest plants for treatment of effluent from a spent nuclear fuel plant is the British Nuclear Fuels, Inc., SIXEP Plant. The SIXEP process is based on ion exchange using an inorganic ion exchanger. In this process, the positively charged cesium and strontium ions are taken up into the crystal lattice of clinoptilolite (a class of porous crystalline aluminosilicates of the zeolite family), in preference to the sodium ions which are naturally present. In this process, water containing the radioactive ions is caused to pass into close proximity to the clinoptilolite, whereupon diffusion takes place to cause migration of the radioactive ions into the clinoptilolite lattice, displacing the sodium ions.

In more recent technology, novel electrochemical cells incorporating ion exchange membranes have been used to rid water of metal ion contaminants in an economical manner. However, such cells generally have not been favored because the waste form (or concentrated effluent) is liquid, which is less desirable than solid waste.

The main disadvantage of the existing electrodialysis technology is that its use in an in-situ remediation or cleanup of either soil or groundwater is extremely limited, partly because of the presence of ionic colloids which will "blind" or plug the membrane, and partly due to the limitation in transport of a "complexed" ion species. Also, these cells can involve relatively complex operation, substantial capital investment in operating hardware, and a liquid waste form which in some cases can comprise a very large volume of waste. Most importantly, none of these processes are able to remove soluble ions from a bulk source.

E. TECHNOLOGY OF THE '1392 APPLICATION

The basic technology of the '1392 application represented a significant advance over prior decontamination techniques. Nevertheless, as is the case with most new technology (and most inventors), the desire for further refinement and improvement of their earlier technology accompanied the present inventors' subsequent research. Inter alia, two areas of interest prompted the research leading to the inventions discussed herein.

First, the present inventors realized that the '1392 application processes and systems were not achieving maximum efficiency. They discovered that inefficiency in the system could be due to the presence of unwanted hydrogen ($H^+$) and/or hydroxyl ($OH^-$) ions in the bulk source. Those ions, which are generated in large quantities at the anode and cathode, are relatively small and thus much more mobile than the larger ions which are the target of decontamination. Once formed, they can migrate rapidly, via the current generated by the electrodes, to the opposite electrode. Further, the generation of hydroxide ions at the cathode raises the pH in the vicinity of the cathode which causes precipitation of the contaminant cations as metal hydroxides. Thus, it was realized that much of the current being generated by the electrodes was being spent on moving the hydrogen and hydroxyl ions, and not the target ions. Further still, an efficient means of isolating the contaminants at the electrodes would be needed.

Secondly, the present inventors realized that treating large areas of contaminated land, such as the land surrounding Chernobyl, required a system having several properties. First, the system should be designed for use where most of the contamination is relatively near the surface. Second, the system should be designed to be able to cover large surface areas, and receive and confine large volumes of contaminants. Third, the system should be designed to be reusable and/or recyclable. Lastly, the system should be relatively mobile such that it readily can be moved to a new area when decontamination of the current area is completed.

SUMMARY OF THE INVENTION

This invention provides new methods and apparatuses for carrying out decontamination of a bulk source such as soil or groundwater. Improvements over the technology of the '1392 application are provided and include processes and apparatuses which effect control of the chemistry in the proximity of one or both of the electrodes to improve the overall efficiency of the system. Also, some additional host receptor matrix designs are provided to accomplish the desired control of the chemistry, as well as accomplish other objectives such as the decontamination of large areas of land.

Accordingly, one embodiment of this invention provides a host receptor matrix (sometimes refereed to as an "HRM") for extracting a target ion from a bulk source and collecting it. The host receptor matrix, which is capable of association with an electrode, comprises components which are ion permeable and capable of immobilizing and/or confining said target ion, and capable of substantially preventing or inhibiting migration away from said electrode of ions produced at said electrode.

In a preferred embodiment, the HRM comprises an ionizable species which will dissociate during application of an electropotential gradient, thereby releasing a monovalent or multivalent exchange ion into the bulk source. Advantageously, the exchange ion is less mobile in the bulk source than a hydrogen ($H^+$) or hydroxyl ($OH^-$) ion.

In another preferred embodiment, the HRM comprises an ionizable species which at least partially buffers hydrogen ($H^+$) ions generated at the anode or hydroxyl ($OH^-$) ions generated at the cathode, thereby preventing or lessening a change in Ph in the vicinity of the anode or cathode.

In another preferred embodiment, the HRM comprises an ionizable species which will dissociate during application of an electropotential gradient. The HRM further comprises a mass polymer which provides structural integrity and an ion conductive polymer having pendant ion exchange sites.

In another preferred embodiment, the HRM comprises a confinement chamber which comprises a material which is ion permeable and water impermeable. The confinement chamber can be a receptacle in which there is a liquid and/or solid which can contain said target ion.

Also provided are processes for extracting from a bulk source a target ion which is a cation, anion, radionuclide or heavy metal ion, and collecting the target ion in a host receptor matrix. The process comprises the steps of introducing into contact with the bulk source either an anode or a cathode, introducing into contact with, or into the proximity of, the bulk source, a second electrode which is different from the first electrode, introducing an HRM according to this invention into contact with, or into the proximity of, the bulk source, such that at least a portion of the HRM is located between the two electrodes, and inducing migration of the target ion from the bulk source into the HRM by means of an electropotential gradient between the two electrodes. The target ion is thus immobilized and/or confined within said at least one host receptor matrix. Optionally, the HRM can be removed from the bulk source. It then can be treated to remove the target ions and/or other contaminants, or it can be disposed of, or recycled for further use.

In a preferred embodiment, an electrolyte is added to the bulk source to modify the chemical state of the target ion.

Also provided is an apparatus for extracting ions from a bulk comprising an electrode in association with host receptor matrix of this invention.

Accordingly, it is an object of this invention to provide an improved method for decontaminating a bulk media such as soil or groundwater.

Another object of this invention is to provide an improved method for mobilizing and for transporting undesirable contaminant ions.

A further object of this invention is to provide a practical means for groundwater and soil remediation to be carried out in-situ.

Another object is to provide a method whereby radionuclide contaminated groundwater can be treated in place without the need to pump the water to the surface.

Another object of the invention is to effectively decontaminate soil of ionic contaminants, with a minimum of excavation, transport, and handling.

Another object of this invention is to provide a concentrator/collector medium which is in solid form, or otherwise confined or isolated, thereby simplifying or eliminating the need for secondary processing steps to achieve a concentrated, solidified and transportable wasteform.

Another object of this invention is to remove unwanted ions from soil while leaving the soil substantially useful agriculturally.

Another object of this invention is to provide a means for effectively remediating ground water and/or soil contaminants with a minimum of exposure to operating personnel.

Another object of this invention is to provide an in-situ soil or groundwater decontamination process which will not leak or "bleed" chemicals into the soil or groundwater.

Another object of this invention is to extract non-ionic contaminants by causing them to behave as ionic species via the introduction of ionic surfactants or charged complexant species.

Another object of this invention is to provide a mechanism for controlling electrode chemistry via the introduction of buffering chemicals which directly surround the electrode.

Another object of this invention is to provide a more efficient electrokinetic remediation process for soil or groundwater by controlling the chemistry at or near the electrode, which precludes the liberation of $H^+$ ion or $OH^-$ ion, instead liberating ions which are less mobile and preferably which will form complexes with the contaminants which are to be removed.

Additional objects and advantages of the invention will be set forth in part in the description that follows, and in part will be obvious from the description, or may be learned by practice of the invention. The objects and the advantages of this invention may be realized and obtained by means of the processes and apparatuses particularly pointed out in the appended claims.

BRIEF DESCRIPTION OF THE DRAWINGS

FIG. 14 is a schematic showing illustrating a host receptor matrix comprising a layer of polytetrafluroethylene.

FIGS. 15A, 15B and 15C illustrate an oval shaped host receptor matrix.

FIG. 16 illustrates a comparison of different HRMs in accordance with this invention used to decontaminate uranium from soil.

FIGS. 17A and 17B illustrate the electrode chemistry for removal of sulfate ions in accordance with this invention.

DETAILED DESCRIPTION OF THE PREFERRED EMBODIMENTS

Figure 1:
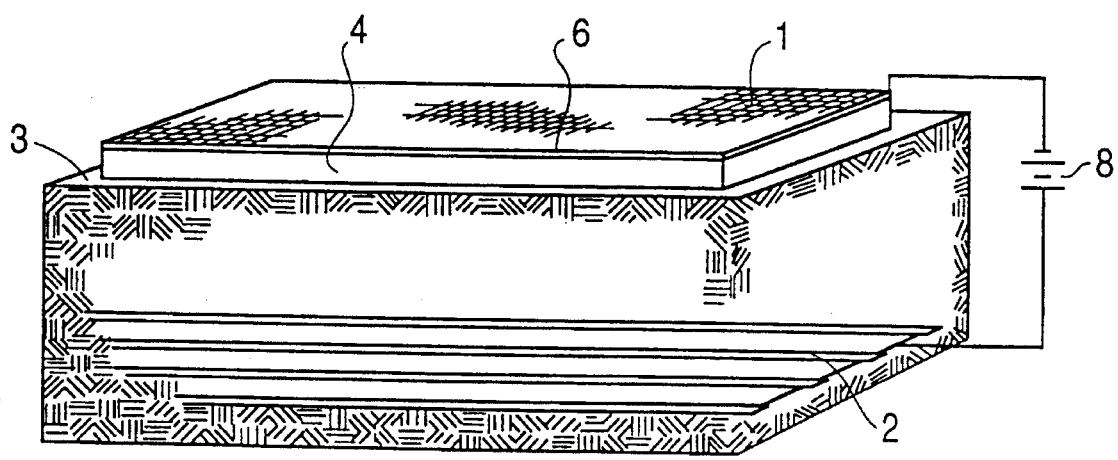
FIG. 1 is a schematic drawing of electrical extraction of cations from soil using a host receptor matrix in spray applied or sheet membrane form.

The present invention provides a method of treating soils or groundwater that have been contaminated with radioactive materials, metal cations, and/or metal anions. In basic terms, the processes of this invention generally involve causing ions to migrate under an externally applied electropotential (via electrodes) to a host receptor matrix where they ultimately are immobilized and/or confined. The host receptor matrix generally either surrounds one or more electrodes, or is positioned such that a portion is located between the electrodes.

Immobilization and/or confinement can be accomplished by one or more means. For example, immobilization can be accomplished using polymers having receptive sites and/or ion exchange media. Optionally, confinement can be accomplished in part by ion concentration within interstitial water domains which are a part of the host receptor matrix. Alternatively, immobilization and/or confinement can be achieved, in part, by precipitation which occurs within the host receptor matrix, or by dissolution into a chemical solution which is part of the host receptor matrix. Yet another alternative is achieving confinement by electrolytic reduction at the cathode.

By immobilization, it is meant that the target ion is immovably fixed into the host receptor matrix. That would be the case, for example, where the host receptor matrix comprises a polymer having receptive sites for the target ion. Confinement, on the other hand, means the target ion is retained in the host receptor matrix in a manner which permits it to move within a limited area. Such would be the case, for example, when ions concentrate within interstitial water domains which are a part of the host receptor matrix, or where the HRM comprises a liquid into which the ion migrates. The ion, while confined within the HRM, would not be considered immobilized.

A. EXEMPLARY DECONTAMINATION CONFIGURATIONS

The skilled artisan will appreciate that, using the HRMs processes and apparatuses taught herein, many different decontamination configurations are possible. The following embodiments are illustrative of only some of the possible configurations in accordance with this invention.

In accordance with a basic embodiment of the invention, target ions in a bulk source, e.g., soil or groundwater, can be mobilized and moved by an electrical potential, which can be generated by a pair of electrodes or an array of three or more electrodes. As ions approach one of the electrodes (cations seek the cathode; anions the anode), they encounter a host receptor matrix, which provides ion transport until the ions are immobilized and/or confined by means within the host receptor matrix. Exemplary means which can be used to immobilize ions include:

1. ion receptor sites grafted onto a polymer chain;
2. ion exchange resin such as a zeolite;
3. a zone of specific Ph which causes precipitation ion focusing;
4. a confined zone of dissolution chemicals; and
5. reduction of cations to metal at the cathode.

The metal ion decontamination process of this invention can be carried out in-situ when the anodic and/or cathodic elements are provided within a host receptor matrix, and/or are positioned one relative to the other such that the ionic species must move through the host receptor matrix in order to approach an electrode. The electrode and host receptor matrix can be positioned contiguous to the bulk media (either soil, water, or similar such contaminated bulk source) and at an optimum distance from each other. For large areas, arrays of electrodes and host receptor matrices can be used. The optimum electrode spacing can be determined from well recognized set of engineering parameters, such as the conductivity of the soil, the electrical capability of the power supply and conductors, the depth to which contaminants have penetrated, the nature of the contaminants, and the soil type. As used herein, the term in-situ refers to a process that can be conducted at the contaminated bulk source itself, i.e., the soil or water does not have to be transported to a remote site for treatment.

As discussed in detail below, the host receptor matrix will comprise an ion permeable element and an ion confinement element, which can be the same or different, and which can optionally incorporate ion immobilizing fillers, and ion conductive polymeric species which can be positioned in such a manner that the matrix is electrically "in-series" with the current flow. The host receptor matrix can provide these two functions using discrete layers or zones, or as a homogeneous composite. Additionally, the physical characteristics of the host receptor matrix should be such that, once loaded with contaminants as a result of the electrical extraction of the ions from the soil or groundwater mass, it will possess sufficient structural integrity or other features which permit removal and disposal of the host receptor matrix while confining the contaminants therein.

1. Above Ground Host Receptor Matrices

Thus, in accordance with one embodiment of the invention, when a metal ion contaminated bulk source (e.g., soil) is encountered, an anode array can be installed in a spatial arrangement and at a depth dictated by the physical characteristics of the contaminated bulk source. The host receptor matrix can be deposited over the contamination area, and a cathodic electrode can be located to function in conjunction with the matrix. FIG. 1 illustrates such an in-situ decontamination array.

In accordance with the invention as illustrated by FIG. 1, a cathode array 1 can be positioned on the soil surface 3 and an anode array 2, for example, a ribbon of metal oxide coated titanium, can be installed in the ground at a suitable depth below soil surface 3, which depth depends on the depth of contaminants in the soil. For example, if contaminants are observed to penetrate to 10 cm depth, anode array 2 would be positioned at a depth below the 10 cm contaminated zone. Alternatively, the cathode array could be located in the soil and the anode array positioned on the soil surface. The cathode may be made of, for example, copper, steel, stainless steel or graphite. The anode may optionally be made of platinum, oxide coated titanium, stainless steel or graphite. Optionally, sacrificial anodes based on iron or copper can be used.

A polymeric host receptor matrix 4 can be spray applied directly to the soil surface 3 using, for example, twin stream proportioning spray equipment. An electrical conductor (not shown) which may consist of light gage aluminum wire fabric can be installed over the host receptor matrix 4 to uniformly contact the membrane surface. Optionally, an electrically conductive coating 6 (for example carbon filled or conductive fiber filled) can be applied thereto to assure good electrical contact. An example of such a coating employing conductive fillers is disclosed in U.S. application Ser. No. 07/348,525 filed on May 8, 1989. This coating formulation uses graphite filler and, optionally, 20–30% metallic powder, and may comprise, for example, 30 parts by weight deionized water, 15 parts carbon fiber and 5 parts water swellable polyurethane polymer such as Scotch Seal Chemical Grout 5610, manufactured by 3M.

An electrical power supply 8 is connected to provide, for example, a 0–100 volt D.C. electrical potential between the two electrodes. A suitable electrolyte, for example, potable water, can optionally be introduced into the soil bulk to enhance electrical current flow. Metal cations in the soil are induced by the electrical potential to move toward polymeric host receptor matrix 4. The ion permeability of the host receptor matrix 4 is such that ions can travel into the matrix.

As an ion enters the host receptor matrix 4, it may be exposed to any one of the several phenomena discussed above which will result in its immobilization and/or confinement within the host receptor matrix.

Yet another ion immobilization option, which applies when using the above-described porous PTFE membrane as the host receptor matrix, involves immobilizing the ion within an area beyond the PTFE membrane. In one embodiment, the PTFE membrane is one element of a confinement chamber which resembles a "pillow tank," wherein the part of the PTFE membrane rests in direct contact with the soil surface (see FIG. 14).

In FIG. 14, a confinement chamber 150 in the shape of a pillow tank is provided. The interior of the chamber 152 is filled with an ion conductive solution and at least one electrode 154. The interior may also include solid media (not shown) useful for immobilizing and/or confining the target ions. The electropotential is generated by opposite electrodes 156, 158, 160, 162 and 164 which are located beneath the soil. Those electrodes, along with electrode 154, are connected to power supply 166. The ion-contaminated solution contained in the envelope then can be treated using conventional techniques. A port 168 is provided for venting off-gas which can be further treated. In certain situations, such a membrane can provide a very efficient and effective means for ion transport between the two electrodes, because it can provide a large surface area that is in contact with the contaminated zone.

In the above embodiment, the host receptor matrix can comprise a water impermeable, low surface energy, ion-porous film such as a polytetrafluoroethylene film (PTFE-commonly known as Teflon® or Fluon®, marketed as Tetratex® or Gore Fabric®), which surrounds the electrode in a manner that provides confinement for process chemicals, i.e., a confinement chamber. Alternatively, the host receptor matrix can comprise a highly elastomeric composite such as a polyurethane/polyol copolymer, for example, Scotch-Seal Chemical Grout 5610, manufactured by 3M Corporation, or a water soluble polyacrylamide Cyanagel 2000, manufactured by American Cyanamid Company. In a variation of this embodiment, soil decontamination can be achieved using an ion permeable sheet-type host receptor matrix which can be supported so that it can be repeatedly repositioned over multiple contaminated soil zones. The number of repeat cycles can be maximized by providing the host receptor matrix with multiple zones such that ionic contaminants permeate a first zone and are confined in a second zone which can be easily pumped and processed. Such a process, which can include a porous PTFE membrane as described above, can provide for electrode chemistry control and, optionally, a release of ionic complexants into the bulk soil mass. This embodiment also can provide efficient contaminant extraction with high capacity ion uptake.

Another embodiment of the invention provides a composition comprising liquid complexants and/or fine particle size ion exchange materials and a polymeric host receptor matrix, which can be mixed with polymerization coreactants. The solution can then be applied in liquid form such that it conforms to surface contours. The liquid host receptor matrix polymer composition subsequently cures to a tough, yet highly elastomeric sheet which enhances the handling characteristics during removal, while retaining the ion transport properties.

An illustrative use for such a liquid-applied, curing type membrane material is the application of this membrane host receptor matrix to the internal surfaces of a metallic storage tank or mixing vessel prior to filling the tank with a contaminated medium. In such case, the polymer membrane would have only a minimal adhesive bond to the vessel shell. Upon completion of the electropotential induced ion uptake cycle, the polymer membrane, loaded with contaminant ions removed from the bulk, is readily strippable from the vessels, shell and processed, for example, by incineration. Fillers incorporated in such a membrane can be used to control electrode chemistry and optionally to optimize contaminant ion uptake.

Where appropriate, for example, in an emergency where time for action is limited, the host receptor matrix membrane can be applied via spray to the surface, (e.g. soil) thereby immobilizing and/or isolating a spill area. Electrodes can be put into place later via incisions in the host receptor matrix polymer membrane, to establish the electropotential. This embodiment may be useful for decontaminating soils which have been contaminated, for example, by fallout from weapons testing, a nuclear accident, spills of liquid wastes, contamination from seepage pits, contaminants due to leaking drain lines, or any similar such event.

Given the guidance of this disclosure, skilled artisans will appreciate other ways in which ions can be captured according to this invention.

2. In Ground Host Receptor Matrices

Alternatively, the host receptor matrix can be introduced into the bulk source, (e.g., soil) in some other configuration such as electrode/host receptor matrix cylinders installed via, e.g., well bores, either vertically and/or, in some cases, horizontally in the soil. In all cases, a current flow is established between the anode and cathode, which current flow is provided by an impressed voltage that is sufficient to cause a migration of the radioactive species from the soil matrix to the host receptor matrix.

Figure 2:
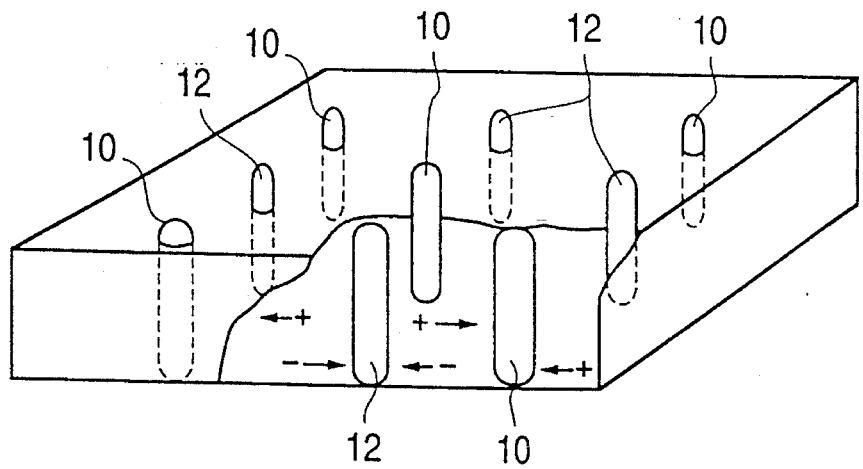
FIG. 2 is a schematic drawing showing an electrode array for in-situ electroextraction using a host receptor matrix.

FIG. 2 depicts a vertical in-situ electrode array in which the electrodes are arranged in alternating polarity. In the arrangement shown, each anode 10 would drive ions toward cathodes 12, each of which is surrounded by a host receptor matrix. The ions then can be immobilized and/or confined by the host receptor matrix. The electrodes could be arranged in alternating polarity.

As described above, the engineering design of the electrode array generally will be site specific. The design will consider numerous variables in arriving at an optimum anode and cathode array and the resulting electrical field and ion flow between the two electrodes.

B. ELECTROCHEMICAL DESIGN CONSIDERATIONS

There are several references that disclose the basic principles relevant to the design of the electro-extraction apparatus, including Hine, F., ELECTRODE PROCESSES AND ELECTROCHEMICAL ENGINEERING, Plenum Press, New York, 1985; and Heitz, E. and Kreysa, G., PRINCIPLES OF ELECTROCHEMICAL ENGINEERING, VCH Publishers, New York, 1986. Where an electrolyte is employed, the choice should minimize introduction of foreign ions to avoid competing chemistry in the host receptor matrix. Moreover, the current flow should be sufficient to cause migration of target ions. Optimization of the apparatus will ultimately involve the several disciplines of transport kinetics, chemical kinetics, chemical thermodynamics, ionic mobilities, and absorption phenomena.

Those skilled in the design of electrochemical devices will recognize the fact that there are practical limits to the "reach" or range of influence of the "cell." An optimum design will take into consideration the geology, soil chemistry, apparatus installation and operating costs, decontamination time objectives and such, and, based on these factors, the anode positioning, geometry and spacing can be determined. Actual dimensions will have important consequences for mass transfer, as well as for electron transfer kinetics.

1. Electrode Considerations

High surface area electrodes are generally preferred, i.e., those with a ratio of surface area to cross-sectional area greater than 3. Such high surface area electrodes have the advantage of enabling a higher efficiency in uptake of contaminant ions. For example, a typical decontamination application involving a cell incorporating a horizontal "well-type" electrode/polymer array can produce results that are as much as eight to ten times those that would be realized with prior art anode/cathode surfaces.

Alternatively, as discussed above, the electrode may comprise a polymer or other material which covers the surface of the soil, thereby providing an efficient means of cleaning shallow contaminants present over a large area.

It also has been observed that electrode chemistry will affect the productivity or longevity of the electrochemical cell. Therefore, high performance electrodes obviously can play an important role in performance. Graphite cylinders and metal oxide coated titanium are two examples of such electrodes. The selection of the host receptor matrix composition can also augment the electrode performance. For example, high conductive polymer compositions have been found to provide an improvement in operational efficiency.

It has been found by the inventors that certain electrically conductive polymer compositions, discussed in Example 9 below, can function to displace the electrode chemical reaction such that sacrificial destruction of the metallic anode is minimized. Such a composition may consist of a polymeric membrane highly filled with a graphite filler. An even distribution of the current is maintained by placing a steel mesh on the back side of the polymer, i.e., isolated from the electrode surface. This type of construction may be used as an anode without consumption of the steel mesh. Such composites can be configured so that they comprise the inner layer of the host receptor matrix and thus encase the anode, thereby ensuring that chemical reactions take place away from the metal anode surface.

The electrode at the anode should be constructed of a material that is not subject to rapid degradation in such exposure. Furthermore, the selection of the anode can play an important role in enhancing the electrode life. Materials such as oxide coated titanium have been found to provide viable anode materials. Where it is desirable to use less sophisticated and less costly anode materials, electrically conductive polymer materials, such as those described above, can be used to protect the anode from deterioration.

2. Power Supply

The power supply used for decontamination is direct current ("D.C.") type, which provides the driving potential for electrons. The electrochemical cell performs both reduction and oxidation such that every electron added at the cathode (reduction) must be balanced, and remain in balance, with the loss of an electron at the anode (oxidation). The direct current passing through the decontamination apparatus causes two distinct chemical processes to occur, one at each electrode. The power supply is both a source of electrons and an electron "sink".

One useful type of power supply is a rectifier which is controlled by a variable transformer. A tap transformer (which has multiple taps and is controlled by switching the output connection from one tap to another) can also be utilized.

3. Electrolyte Preparation

Those skilled in the art of metal extraction will realize numerous available materials which can be added to the bulk source to modify the chemical state of the ions to be extracted. Selection of these materials will be based on considerations such as environmental impact, efficiency of the additive in enhancing ion mobility, economics, handling characteristics, etc. The ideal electrolyte is water, both from environmental considerations and economics. Other electrolytes that are viable are liquid fertilizer solutions, soil nutrients and liquid extractants used in chemical leachate mining operations. For example, ammonium ion-containing fertilizers, as well as non-ammonium ion-containing fertilizers can be employed.

The mixing facility for electrolyte preparation may consist of corrosion resistant tanks, a powered agitator, and suitable provisions for chemical inlet and outlet. In the electrical extraction process described herein, there is normally only one electrolyte occupying the bulk space between the two electrodes. One can readily anticipate many variations where the selected electrolyte which optimizes the extraction of a specific ion at a specific voltage could, upon depletion of said specific ion, be replaced by another electrolyte to remove another ion or spectrum of ions. In yet another possible variation, the electrodes could be reversed after extraction of a first ion to extract a second ion.

In one useful application of this technology, the electrolyte is introduced at the electrode and thus becomes involved in the electrode chemistry. The result is a liberation of a charged, ionic species which can complex with the targeted contaminant thereby enhancing the effectiveness of the overall process.

C. HOST RECEPTOR MATRIX

The host receptor matrix is an important part of this invention for several reasons. Inter alia, the host receptor matrix provides a means for:

capturing the contaminant ions for easy removal and safe transport;

controlling the electrode reactions, e.g., buffering the hydroxyl ion generation at the cathode and the hydrogen ion at the anode;

supplying a controllable amount of leach ions (complexants for example) to the bulk source; and achieving the above in a batch mode, i.e., the need for external process devices such as pumps is avoided.

There are many possible variations for preparing the host receptor matrix, which at least partially surrounds or otherwise electrically shadows the electrode. (An "electrical shadow" is the barrier effect which a material of high dielectric property will impart upon an electrical flux field, when such a barrier is placed upon the pathway which the flux field would otherwise occupy.) The host receptor matrix for such a service can comprise a single or multiple layers, each of similar or varying compositions. The host receptor matrix can be separate from, or integrally formed with, an electrode. For example, the host receptor matrix can comprise an electrically conductive elastomer to which a metallic mesh backing or electrically conductive metallized polymer can be installed to function as an electrode.

It has been discovered that the effectiveness of the process of the invention depends, in part, on the electrochemistry which takes place at the electrode during the operation of the cell. The effectiveness also depends upon the ability of the host receptor matrix to confine the ionic species which are electrically driven into the envelope and, at the same time, to permit ions to migrate from outside the envelopes into the containment zone. The structural component (e.g., polymer)

of the host receptor matrix should be, to some degree, water-loving (hydrophilic), without being water soluble, i.e., it should not dissolve in the water. To the extent possible, it should also be chemically inert to water and to electrolytes such as salt, acids, caustic and other chemicals which are encountered at or near the electrodes.

Where the host receptor matrix is a polymer, the structure and porosity is determined principally by the conditions of polymerization of the "mass" polymer (to which ionic sites may or may not be pendant). To this mass polymer, it may be desirable to blend polyelectrolyte materials. Additionally, it may be advantageous to incorporate into the matrix, selected fillers and chemical additives, which become immobilized within the matrix. Alternatively, it mat be desirable to incorporate into the mass polymer an ion conductive polymer having pendant ion exchange sites. The mass polymer and ion conductive polymer may comprise separate layers or may be intertwined.

Polymers containing major amounts of nonpolymerizable diluents and polyelectrolytes have been previously disclosed. Macroporous ion exchange resins (sometimes referred to as "macroreticular" or "isoporous") have become prominent since about 1960. For example, in U.S. Pat. No. 3,808,305 to Gregor reports an interpolymer membrane of a matrix polymer, a polyelectrolyte and a cross-linker to achieve desired pore size. Highly hydrophilic polymers such as polyacrylamide or hydrophilic polyurethanes can be used. Also, porous polytetrafluoroethylene such as that described above, provides a useful membrane. In this instance, the porosity permits ion transport under an electropotential, however, the low surface energy coefficient precludes the flow of water and other highly polar electrolytes through the membrane.

Thus, the goal of designing a host receptor matrix is to provide a stable and functional host receptor matrix which can (1) immobilize and/or contain ionic species, (2) control the chemistry at the electrode, and (3) optionally, control ionic species introduced into the soil or groundwater.

1. Suitable Polymers

In addition to those described above, the following are materials exemplify those which can be used as the mass polymer component in the host receptor matrix of the invention are polymers of the following species: the epichlorohydrin-bisphenol A epoxies, bisphenol F epoxies, vinyl esters, polyesters, the N-vinyl lactams, examples of which are N-vinyl pyrrolidone and Nvinyl imidazole; C2–C4 alkylene oxides such as ethylene, propylene and butylene oxides; vinyl alcohol, made as the polyvinyl alcohol by hydrolysis of polyvinyl acetate; cellophane and cellulose acetate; nitrocellulose, e.g., pyroxylin of degree of nitration about 11%–12% N; polyurethane including emulsions or specially formulated hydrophilic species; and acrylics such as polyacrylamide and polyacrylic acid. In certain instances, emulsions of these polymers have been successfully used to form functional mass polymers.

Cross-linking is optional. Successful host receptor matrices have been made with polymers that form rigid gels solely by incorporating water within the matrix. Other successful structures have been provided by chemical crosslinking and networking of polyfunctional agents. Examples of such cross-linking agents are polycarboxylic acids such as fumaric, oxalic, adipic, maleic and phthalic acids, and certain primary and secondary amines which are reactive with polyurethanes or epoxies. Also many of the water soluble polyhydroxy compounds function both as the structural polymer matrix and as a plasticizer, for example, dimethylhydroxy ethylene urea; organic di-isocyanates, e.g., hexamethylene, 2,4-tolylene, and 4,4'-diphenylmethane diisocyanate; and divinyl monomers, e.g., monomers having two ethenoid bonds (or groups) as in methylene bisacrylamide or divinyl monomers.

Where used, chemical cross-linking can be effected by direct copolymerization of the polymer and cross-linking agent in-situ. One successful matrix polymerization method provides for a hydrophilic polyurethane polymer to be added directly to an aqueous slurry wherein an aqueous gel results. Another provides for a vinyl ester and water mixture to be solidified with an initiator of ethenoid bond polymerization. Suitable initiators are benzoyl, lauroyl, and t-butyl peroxide. Proportions of the cross-linking agent are approximately 0.1%–2% by weight of the vinyl ester polymer.

Still another advantageous mass polymer uses a polyurethane emulsion which is cured using a blend of epoxy emulsion and hydrophilic amine, which cures to form a stable polymer and water matrix.

Still other useful matrix structures have been obtained using polyvinyl alcohol and polyvinyl butyral modified polyvinyl alcohol.

The outstanding chemical resistance of fluropolymers suggests that such polymers would also be excellent candidates for the mass polymer in the host receptor matrix.

Other examples of mass polymers include a composition by weight based on styrene as follows: styrene 100, divinyl benzene 2, azodiisobytyrodinitrile 4, long chain alcohol 6. To this mass polymer matrix, the ion permeable electrolyte, ion exchange fillers, organic ion exchanger and similar optional components can be added.

Another successful mass polymer composition by weight based on acrylic is as follows: N. N' methylene bis acrylamide 28, potassium acrylate 10, acrylamide 80, dimethylaminoproprionitrile (DMAPN) 1.8, ammonium persulfate 1.0. This composition has inherent ion exchange properties which can be supplemented with the optional components as described above.

One embodiment of this invention relates to a host receptor matrix wherein the mass polymer comprises a porous ceramic membrane element manufactured of metal oxides, primarily alpha alumina (membralox manufactured by Societe des Ceramiques Techniques). The cylindrical membrane (7 mm-internal diameter and 10 mm outside diameter, for example) can be end-sealed with impermeable epoxy polymer and filled with a cation exchange bead such as GT-73 (Rohm & Haas), allowing a suitable void space for bead expansion. A graphite electrode can be installed in the center of the ion exchange media and rigidly fixed via an impermeable polymeric material. The result is a rigid cylindrical element constituting a host receptor matrix which surrounds the electrode. Other types of ion exchange resins which can be used with this invention will be discussed below.

Another ceramic class mass polymer useful in the present invention is an open cell glass foam matrix formed by a mixture of alkali silicate, a surfactant and sodium silica fluoride. To form a suitable host receptor matrix, the foam is impregnated with a polymer such as polyisoprene and the resulting composite is sulfonated using techniques disclosed in U.S. Pat. Nos. 3,613,957 and 4,071,546.

One skilled in this art will understand that the interior annulus of the ceramic membrane element optionally can be filled with the ion exchange media as described. The media used for filling the annulus between the electrode and ceramic exterior shell can be selected, depending on the specific use, from a wide variety of materials, including ion exchanging compound, ion immobilizing compounds, acid polymers and the like, to achieve optimum ion immobilization and/or confinement.

Another example of a host receptor matrix comprises an exterior of melt blown polypropylene fibers formed into a cylindrical element. The cylindrical element (15 mm OD and 14 mm ID, for example) can be sealed at the base with an impermeable epoxy polymer and a graphite electrode can be installed in the center. The interior annulus can be filled with an ion exchange bead material such as GT-73. The graphite electrode is preferably rigidly fixed and the exterior top surface is preferably sealed via an impermeable polymeric material.

2. Optional Elements

There are several optional elements that can be added to the host receptor matrix. One such element is an ion conducting polyelectrolyte which can be incorporated to provide electrical conductivity via current carried by charged ionic species that travel within the HRM and ultimately to the soil/groundwater interface. For example, a series of fixed charge sites can be provided in a long chain polymer array which provides the requisite ion immobilization. The composite described herein is unique in that both properties can be achieved by a polymer alloy which is in close contact with the aqueous phase, and which provides receptors for the containment ions. For example, polyethylene imine may be used for the anode host receptor matrix and polystyrene sulfonic acid for the cathode host receptor matrix.

In another example, the HRM can comprise a mass polymer, a polyelectrolyte and optionally a cross-linker, for example, ion exchange beads incorporated in a polymer structure. When the mass polymer crosslinks to form a stable structure, the microstructure consists of a network of ionic transport sites whose function is to enhance charge transport through the matrix. The composite has yet another unique characteristic, i.e., the electrode can function as an integral part of the host receptor matrix. This composite host receptor matrix comprises yet another novel means for effecting in-situ bulk media decontamination.

The mechanism for ion conduction by polymers is a complex phenomenon. One explanation, which has been proposed for analyzing the interaction of a polyethylene oxide-alkali metal complex, is that the phenomenon depends on a pendulum-like movement within the elastomeric phases of the polymer. This movement is postulated to be strongly dependent on the freedom of movement (for cooperative rearrangement) of polymer segments, and on the associated local free volume. It is theorized that this movement allows the cation to be passed from an adjacent counter ion site, and thus accounts for the migration along the polymer's length. From this theory, one can conclude that optimizing an ion conducting polymer matrix material might be achieved by working with the solvating polymers involved in the matrix.

Such analysis could explain the generally accepted belief that the use of plasticizers helps to reduce the glass transition temperature (Tg) of the polymer and hence improves the conductivity of the polymer electrolyte.

Another mechanism that may contribute to determining the ion conductive property of the polymer electrolyte is the ligand or anion receptor site. Scientific literature is filled with extensive explanation for possible behavior. For example, the use of amine functions favors cation coordination with alkali metals because of the amine nitrogen. Specifically, the donor number (DN) for triethylamine is 61, versus a DN of 20 for tetrahydrofuran or 14 for polyethylene oxide. This would lead one to believe that such an amine functional polymer would be a candidate for alkali metal ion transmission. The strong similarity between such amine polymers and crown ethers confirms the theoretical hypothesis since the fully nitrogenized cages of the crown ether are used as complexing agents for alkali metals.

The ionic host receptor matrix is essentially an ion trap. One of the optional elements of the receptor matrix, an ion exchange polyelectrolyte, contributes to an ion transmission and ion immobilization properties. While the ion exchange sites on this polyelectrolyte are important, especially in achieving ion transmission, the decontamination process accommodates a substantial range in the type of ion exchange sites which can be incorporated into the host receptor matrix polymer composite. The desired function is achieved via use of these conducting polymers, otherwise called "aprotic" polymer electrolytes, which are a class of ion conduction materials useful for electrochemical processes.

A candidate material for the polyelectrolyte found in "inimically-conducting" polymers is the so-called conjugated unsaturated polymers. The most successful results were found in a family called charged polymers and polyelectrolytes. Charged polymers are salt-bearing, solvating polymer complexes known to be a solid solution of salt in a polymer. Their electrochemical performance is essentially the same as that of a liquid electrolyte. Polyelectrolytes, a preferred class of polymers, bear their own ion generating groups chemically bound to the macromolecular chain. The presence of a counter-ion maintains the electro-neutrality. An example is polystyrene sulfonic acid or polystyrene sulfonate.

Acid functionality is a desirable feature when the host receptor matrix is used at the cathode. Examples of polymer acids having such a feature are: polyethylene imino acetic acid, molecular weight 50,000–100,000 (PEI-1000 from Dow Chemical); heptadecyl phosphoric acid HDPA $C_{17}H_{36}OPO(OH)_2$; poly sodium vinyl sulfonate; and polystyrene sulfonic acid.

The weakly acidic polymers such as polyacrylic acid are relatively non-adsorbing and act as a cation permeable polyelectrolyte in a highly alkaline environment.

Another example of a matrix having well controlled ion permeability involves a urea formaldehyde mass polymer combined with a sulfonated polystyrenated naphthalene polyelectrolyte, having a filler material which is a synthetic zeolite of the clinoptilolite family. An example is the commercial product "Syloid ZN-1" which is supplied by Davison Chemical.

In contrast with the prior art technology, which provides either ion permeation or ion immobilization, the host receptor matrix of the invention functions to provide an ion permeable medium functioning within an ion immobilization or confinement matrix. The host receptor matrix functions in a manner which can be analogized to ion chromatography. In the initial operation, the outermost region of the host receptor matrix and electrode composite functions as an ion transport media; the composite provides a one-way ion flow, which is well known in the prior art, and which is essential in electrodialysis phenomena. Because the matrix restricts migration of the counter-ion (the anion) as the cation moves deeper into the polymer matrix, it experiences a continuous gradient of steadily increasing pH. Ions which are prone to form insoluble salts when they combine with an anion thus form an insoluble complex.

This tendency of positively charged ions to form insoluble salts upon contact with an anion can be enhanced by the use of additives such as reducing solutions. Such solutions can comprise aqueous hydrogen sulfide, ammonium thiosulfate or a thiocarbonate such as "thio-red", manufactured by Environmental Technology of Sanford, Fla. The immobilization of the complexed salt is achieved by the exchange sites associated with the polymer, or alternatively by ion exchange fillers such as zeolites, clays, or vermiculites. It is observed that no escape of ions from the HRM is likely, because reverse migration will return the salt to a solubilizing region where it will be resolubilized, and the ion again will be influenced by the electrical field and transported back to the salt-forming region.

In the case of a cation which can be reduced at the cathode, for example copper, the metal ion may migrate under the electrical gradient, steadily proceeding through the cation permeable composite, and ultimately reaching the electrode, where it can plate out as metallic copper. In the case of a hydrogen cation, the path is the same, with an ultimate release of hydrogen gas upon reduction at the anode.

The anode reaction can provide a similar means for ion mobilization and reception, albeit for oppositely charged species.

3. Ion Exchange Filler

As discussed above, ion exchange fillers have been found to be effective when incorporated into the host receptor matrix. Such fillers can be chosen to selectively exchange ions with specific radioactive ions. For example, in a treatise on ion exchange separations with molecular sieve zeolites, presented by John D. Sheryan at the 83rd National Meeting of the American Institute of Chemical Engineers, methods are presented for selectively exchanging cesium, strontium and magnesium, among other metals. When such ion exchangers are used as fillers in a host receptor matrix of this invention, the target radioactive ions which are transported into the host receptor matrix which are exchanged and thus held tightly by the solid ion exchanger. Optionally, an organic resin possessing the desired selectivity can be incorporated. Two types of resins having the selectivity mentioned are a polymerized calix (6) arene in the case of uranium removal, and a polysulfide resin for mercury removal. Resins having crown ether functional groups may be very specific and could selectively remove various alkali metals.

In the present invention, the fine particle size requirement, which is critical in normal diffusion-controlled ion exchange, is not so important. Typical organic polymer ion exchange particles are available in sizes ranging from 16 mesh to about 200 mesh. The fine mesh particles, which are highly preferred in the prior art applications (for increased surface area as described hereinabove), are not so essential for this invention because the fact that the electrochemical potential will compensate by dramatically enhancing the ion uptake rate. Also, the larger particles simplify the confinement (immobilization) of these particles, which is especially important once they are contaminated.

Ion exchange media can be either organic or inorganic. Either category is available in anion exchangers or cation exchangers and in many cases, specific applications will call for blends of both.

An example of organic polymer materials functioning as cation exchangers are the styrene di-vinyl benzene matrix polymers incorporating sulfonate end groups. Anion exchangers typically include a quaternary ammonium site normally coupled with an amine moiety.

There are many ion exchange compositions that satisfy the desired characteristics and function well in a diffusion uptake regimen. For example, early sulfonic resins based on a cross-linked phenolic matrix have been utilized as diffusion-type ion exchange compositions. These resins can be prepared either by sulfonation of phenol-formaldehyde polymers (Amberlite IR-100), by condensation of phenolsulfonic acid with formaldehyde (Dowex 30), or by alkaline condensation of sodium phenoxide, sodium sulfite, and formaldehyde (Amberlite IR-1).

Another class of diffusion-type ion exchange media is the strong-acid resins which are typically sulfonated styrenedivinylbenzene copolymer products (Amberlite IR-120, Amberlite IR-200, Dowex 50, Dowex 50W, Dowex MPC-1, Duolite C-20, Duolite C-25, Ionac C-240, and Ionac C-250). All are spherical products prepared by sulfonation of styrenedivinylbenzene copolymer beads with a sulfonating agent.

Another class of ion exchange media, the weak acid resins, are typified by the presence of functional groups consisting of phenolic, phosphorous, $RP(OH)2$, or carboxylic entities. They can be prepared by cross-linking an unsaturated carboxylic acid such as acrylic, methacrylic or maleic with a cross-linking agent such as divinylbenzene or ethylene dimethacrylate. A large number of these structures have been prepared in the laboratory using various tertiary amines. Popular commercial materials are Amberlite IRA-400 series, Duolite A-101 series, Dowex and Ionac A-540.

Another category of diffusion-type ion exchanger is the strong base anion-exchange resins. These are prepared from the reaction of chloromethylated beads with a dialkyl sulfide such as dimethyl sulfide to produce a disulfonium compound. This is contrasted with the weak base anion-exchange resins which contain primary, secondary, and/or tertiary amine groups, generally a mixture of these. A wide variety of products are available, generally condensation products of aliphatic polyamines with formaldehyde or with alkyl dihalides, such as ethylene dichloride, or with epichlorohydrin.

"Snake-cage" polyelectrolytes are known and have been developed for specific purposes; they consist of a cross-linked polymer system ("cage"), containing a physically trapped linear polymer ("snake"). These are physically constrained mixtures of polymers. The cage polymer restricts the freedom of kinetic motion of the snake polymer. An example is: Retardion 11A8 (The Dow Chemical Co.).

Certain of these structures are useful for specific ions. A good example of this is the unusual affinity for cesium exhibited by dipotassium cobalt(II)' precipitated in the form hexacyanoferrate(II), $K_2CoFe(CN)_6$ of reasonably sized granules. (R. Harjula et al., University of Helsinki, Union Inkatu, 35, Helsinki, Finland, "Removal of Cesium from Nuclear Waste Solutions . . . ", 1985) In more recent work, attention has been focused on optimizing ion transport through polymeric media. The structure and porosity of an ion exchange resin are determined principally by the conditions of polymerization of the base ("backbone") polymer, to which the ionic sites are pendant as mentioned above, to polyelectrolyte materials which are immobilized within a matrix.

Mass polymers prepared in the presence of major amounts of nonpolymerizable diluents were reported by U.S. Pat. No. 2,800,445 to Clarke, who showed their utility in the preparation of ion exchange membranes. Macroporous ion exchange resins (sometimes referred to as "macroreticular" or "isoporous") have been prominent since about 1960. For example, in U.S. Pat. No. 3,808,305, Gregor discloses an interpolymer membrane of a matrix polymer, a polyelectrolyte and a cross-linker to achieve desired pore size. Such resins have pores of a considerably larger size than those of the more conventional gel-type resin. Pore diameters of up to several thousand angstroms are typical. Although these were available in bead form, the major focus was placed on a membrane geometry. Because the pores could be varied tremendously in both size and uniformity, the membranes could be precisely designed for desired selectivity.

Ion exchange membranes produced from these macroporous polymers exhibit distinguishable properties, namely they are capable of providing one-way conduits for certain size ions while restricting passage of large species.

In the prior art, a typical process for manufacturing such a membrane involves casting the membrane from a solvent/ polymer blend solution comprising approximately 20% solids solution in a polymer such as butyralactone (see U.S. Pat. No. 2,957,206), force-curing to insure complete solvent evaporation, then treating the membrane with a polar liquid (i.e., water). Typical matrix polymers have heretofore been vinyl halides, styrene or acrylic. The polyelectrolyte can be polystyrene sulfonic acid or poly acrylic acid (Mol. wt. 4000) or onium class (Quaternary Ammonium Groups). Generally, these films run 3–6 mils thick. Multiple layering is required for up to 25 mil thick films.

Another example of a highly selective immobilizing filler material is potassium cobalt - hexacyanoferrate, which is extremely selective for cesium.

Alternatively, a sheet-type host receptor matrix, discussed above, can incorporate an ion exchange cloth similar to that commercially available from Carborundum Corporation under the designation of "Ion Exchange Cloths and Felts" or ion exchange products marketed by Scott Paper Company under the designation "Industrial Foam Ion Exchanger." These can be useful when properly assembled in the electrochemical array described herein. Such ion exchange cloths or foams can be used alone or as a single element of a multi-element composite. Cellulose fabrics and similar ion exchange media also can be used.

It is important that the electrode used with such an ion exchange cloth or foam should be configured so as to provide a uniform current through the cloth and an electrolyte solution should be provided such that the ion transmission can be maintained through the cloth. These forms can be relatively easily deployed over the contaminated area, easily fitted with electrode membrane, and would be recoverable. For example, an experimental ion exchange fabric was applied directly to the soil surface and topped with a steel mesh for the cathode. Using the anode as a horizontal array buried in the soil. The fabric provided a means of collecting cesium contamination at the soil surface.

4. Permeability-Controlling Outer Layer

When the polymer host receptor matrix is not itself sufficiently impermeable to the counter-ions, that is, it is insufficient in electrolyte exclusion, the HRM may be combined with a thin exterior layer which is less permeable to the ions in the bulk source. Superficial layers which may be applied to the matrix include: those in the form of the free acid or its sodium or other alkali metal salt; quaternary and tertiary amine derivatives of polyvinyl aromatic C6–C9 hydrocarbons such as polystyrene, polyvinyl toluene, and polyvinyl xylene, in which the group $CH_2 - N(CH3)_3Cl$, for example, is attached to a carbon of the aryl ring; melamine formaldehyde resins (e.g., 50%–70%) admixed with guanidine (30%–50%); and polyacrylic or polymethacrylic acid.

Depending on use and processing constraints, thickness of the ion impermeable coating can range from 25 to greater than 10,000 microns.

5. Multiple Layer Configurations

As discussed above, the host receptor matrix may comprise multiple layers, each performing one or more functions. For purposes of this invention, a buffer chamber, or other chamber containing a liquid and/or solid which participates in the HRM chemistry, is considered to be a layer. For example, inner layers can control the chemistry near the electrode to prevent the escape of hydrogen and hydroxyl ions into the bulk matrix, control the electrode chemistry (e.g., by buffering), and prevent the deterioration of the electrode material. The outer layer(s) can be responsible, e.g., for capture of the target ions. Alternatively, the outer layers can be responsible for the first tasks mentioned above, and the inner layer can be responsible for capture of the target ion. The HRM can have two or more than two layers, each responsible for one or more functions.

Figure 8:
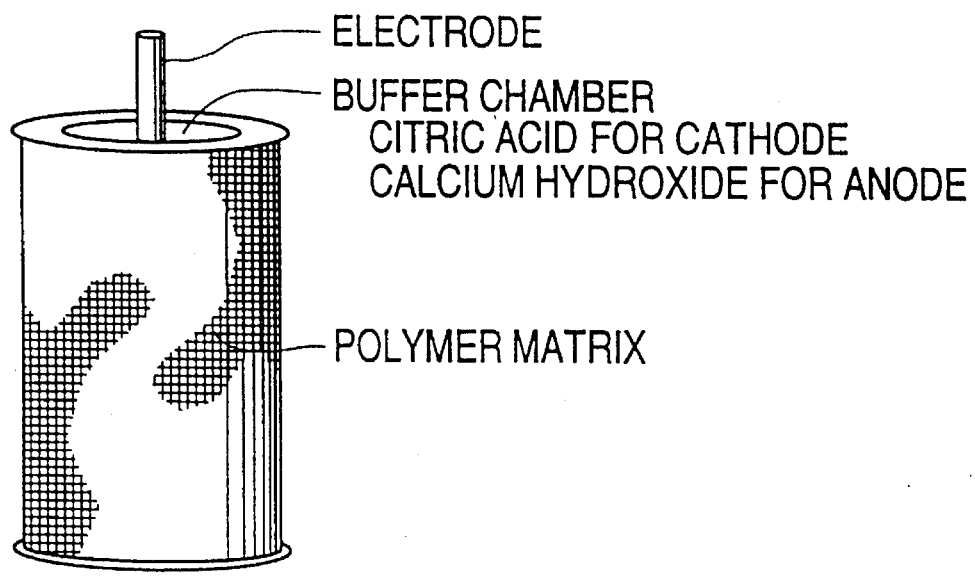
FIG. 8 illustrates a host receptor matrix in accordance with this invention which eliminates hydrogen ions at the anode and the hydroxyl ions at the cathode as charge carriers.
Figure 9:
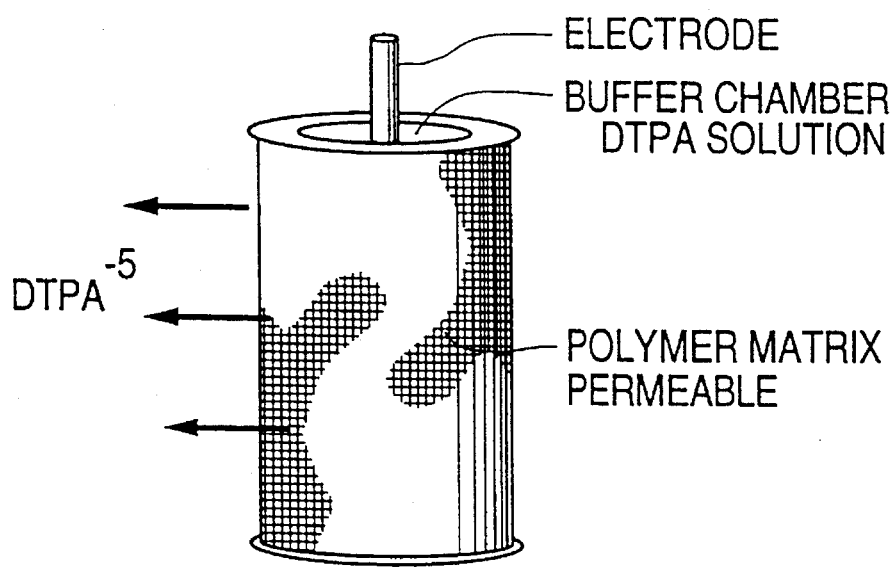
FIG. 9 illustrates a host receptor matrix in accordance with this invention which buffers the electrode chemistry and liberates an anion complex that enhances the mobility of the target ion by forming a highly soluble complex with a net overall charge that favors migration toward the opposite

FIGS. 8 and 9 illustrate multiple layer HRMs in which there is an inner layer (buffer chamber) and an outer layer of a polymer matrix used, inter alia, to capture target ions. In FIG. 8, the buffer chamber contains citric acid in the case of the cathode and calcium hydroxide in the case of the anode. In FIG. 9, the buffer chamber contains DTPA (diethylenetriaminepentaacetic acid).

Cathode reaction:

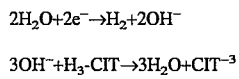

Anode reaction:

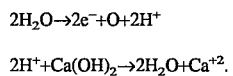

As another example, a cell configuration can provide a dual element cathode polymer in a cylindrical configuration, surrounding a stainless steel electrode. The innermost region can incorporate a gelatinous solution of 1 molar citric acid, which is, in turn, surrounded by a conductive HRM polymer which incorporates deionized water 50% by weight, 10% by weight water swellable polyurethane polymer (Scotch Seal 5610) and 40% by weight synthetic zeolite (product Syloid ZN-1, manufactured by Union Carbide Corporation).

The anode can consist of a duel element polymer system. The interior can consist of a gelatinous solution of 1 molar citric acid, which surrounds a metal oxide coated titanium rod electrode. This gelatinous solution is, in turn, can be surrounded by a conductive HRM polymer which consists of 85% by weight deionized water and 15% by weight water swellable polyurethane polymer (Scotch Seal 5610). A cell of this type may be used, e.g., to decontaminate uranium-contaminated soil. In such a case, ammonium citrate (e.g., 0.01 molar) may be used to pre-dampen the soil. After a period of time, the anode will show uptake of uranium.

Those skilled in the art will readily appreciate many other configurations and buffers which could be used in accordance with this invention.

6. Preparing the Host Receptor Matrix

The bulk source contacting layer of the membrane may be applied in any usual manner, such as by casting a dual stream matrix (in which the two materials, e.g., base and hardener, are pumped and mixed at the gun head) or by spraying a solution of an HRM consisting of a hydrophilic polymer such as a modified polyurethane or polyvinyl alcohol, suitably filed with polyelectrolyte and/or ion scavenging fillers. Optionally, the functional membranes can be made by treating an as-cast polymer matrix using $SO_3$ gas by techniques described in U.S. Pat. No. 3,647,086.

As another option, the sulfonation of a polymer matrix, such as polystyrene, can be made in the usual manner as, for example, applying over the polymer in film form, a solution of sulfur trioxide-triethyl phosphate complex in dichloroethane or other volatile organic solvent therefor, subsequently evaporating the volatile solvent, and then washing out remaining soluble material with ethanol followed by water, to give the finished composite membrane. As the sulfonic acid derivative so made is used in contact with a metal salt, such as sodium chloride in sea water, the acid converts to the metal sulfonate. Fuming sulfuric acid can be similarly used to sulfonate an organic polymer, through its unsaturated sites.

Plasticizers also can be used to control the degree of cross-linking and to control or modify the polymeric network structure and porosity of the matrix.

The same material can be used for the plasticizing effect. Examples of plasticizing materials which also serve as pore formers in the polymeric membranes are water (as used in the urethane water gel), sorbitol (as used in the polyvinyl alcohol matrix), and citric acid may be used as a plasticizer in some compositions.

This dual purpose material, after serving as the plasticizer during formation of the membrane, serves as the pore former which defines the domains which are occupied by interstitial water reservoirs. Examples of such bifunctional components are water, dextrose, sucrose, and other sugars; water soluble polyhydroxy alcohols such as glycerol and glycols such as ethylene, propylene, polyethylene and polypropylene glycols and their water soluble ethers and esters, e.g., the monoethyl ether monoacetate of ethylene glycol, such as "Cellosolve" acetate; formamide and acetamide; mono-, di- and triacetin; diacetone alcohol; and like non-ionic materials.

When designing a host receptor matrix, the skilled artisan may want to consider recyclability. For example, recycling the matrix may not be an important consideration when cleaning up a small spill area, such as contamination near a laboratory waste. receptacle. On the other hand, a major nuclear plant accident, such as Chernobyl, involves decontamination of a massive land mass, and a reusable or recyclable host receptor matrix is essential.

Electrode polarization introduces an additional variable to the process. The literature includes numerous references dealing with this phenomenon. For example, the electropotential can be reversed for an interval sufficient to destroy the polarization effect, then restored. Alternatively, the host receptor matrix can incorporate chemical additives which will enhance the efficiency of the electrode. For example, when using a ruthenium oxide coated titanium electrode for the cathode, the use of the chloride salt provides the means for optimizing the electrode efficiency. If an iridium oxide coated titanium anode is used any material which promotes the oxidation of water and oxygen evolution is desired. Such an example is a sodium sulfate. It is envisioned that such additives can be selectively added to the polymer layer adjacent the electrode.

The following Examples are provided to illustrate various embodiments of the invention. The Examples are not intended to limit the scope of the invention.

Index to Examples

| Examples | Type of Bulk Source | Description of Process |
|---|---|---|
| 1 | Groundwater | Cation Capture in HRM at Cathode Only (Bare Titanium Anode) |
| 2 | Soil | Cation and Anion Capture From SRL Soil |
| 3 | Groundwater | Extended Distance Cell |
| 4 | Groundwater | Anion Capture & Cation Capture in Two HRMs |
| 5 | Soil | Use of Fertilizer-Extractant/Electrolyte to Clean Y-12 Soil |
| 6 | Chemical Solution Cleanup | Comparison of HRM Versus Diffusion into Conventional Ion Exchange Beads |
| 7 | Chemical Solution Cleanup | Ceramic Cylinder HRM |
| 8 | Groundwater | Ceramic Foam Matrix Impregnated with Sulfonated Polyisoprene |
| 9 | Groundwater | Electrically Conductive Polymer to Mitigate Attack on Anode |
| 10 | Chemical Solution Cleanup | Process to Optimize Power Consumption |
| 11 | Soil | Electrode Chemistry to Introduce Complexant Chemistry |
| 12 | Soil | Use of Porous Teflon Membrane to Achieve a Host Receptor Matrix |

EXAMPLE 1

Figure 3:
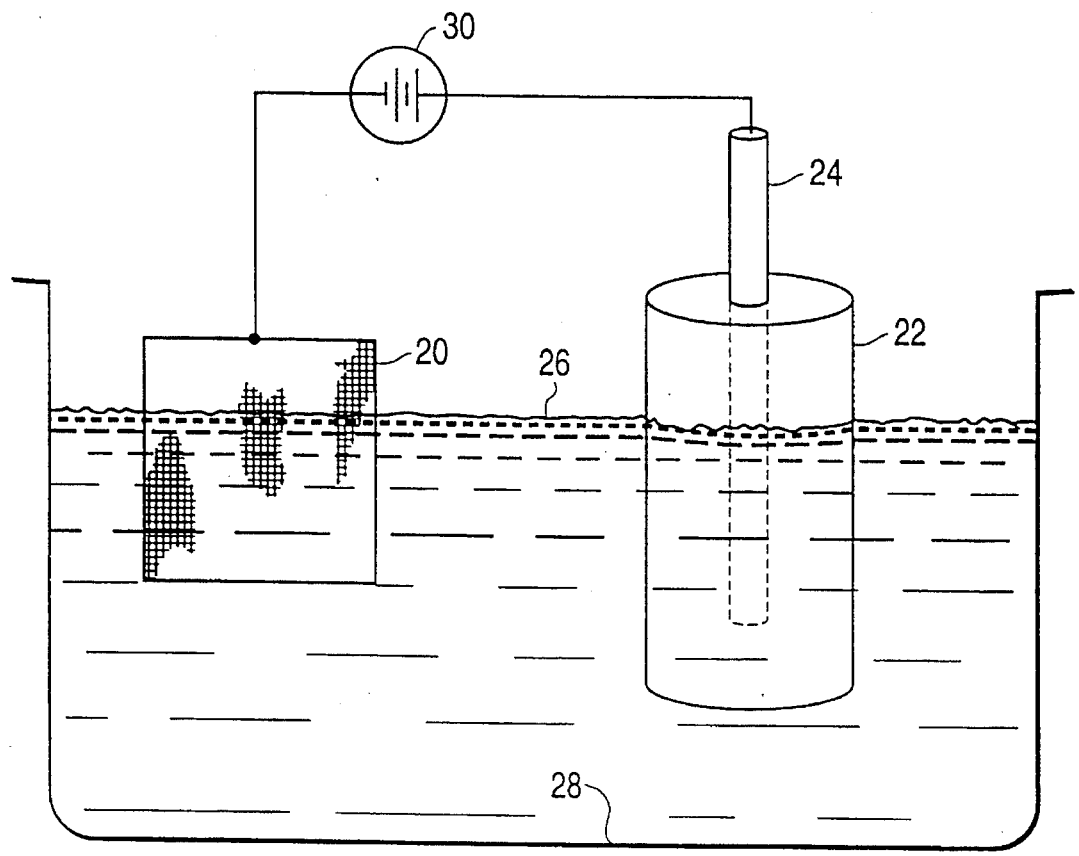
FIG. 3 is a diagram of a laboratory scale electropotential/polymer immobilization cell used to model a cleanup of an underground aquifer.

The laboratory scale electropotential/polymer immobilization cell illustrated in FIG. 3 was used to model the process in a simulated cleanup of an underground aquifer. The anode 20 consisted of an iridium oxide coated titanium mesh (2 inch by 2 inch by 0.06 thickness). A water swellable polyurethane polymer (Scotch Seal Chemical Grout 5610; 3M Corp.) filled with 30 percent of its weight with a cation exchange resin bead GT-73 by Rohm & Haas, and 200 percent of its weight of water comprising the host receptor matrix (HRM) 22 was cast over the cathode electrode to provide complete encapsulation of the immersed portion of the cathode 24, a graphite rod ⅛ inch diameter by 3 inches long. The water 26 to be treated was placed in a stainless steel tank 28. This water solution was designed to simulate the water composition in a large contaminated aquifer. This container held 10.1 liters of the synthetic aquifer water. Table 1 describes the water conditions at the start of the test. The input electrical power was established via a remote power unit 30 which was connected as shown and an electrical potential of 10 volts D.C. was impressed. A good correlation of power demand was observed in comparison to that estimated by the following relationship:

For each faraday of current, one equivalent of H+ ions will migrate from the direction of anode to cathode, ultimately being given up by the water to the polymer composite to subsequently travel through the ion permeable composite, (the catholyte) continuing in the direction of the cathode. Correspondingly, one equivalent of OH-ions is oxidized and released as gaseous $O_2$ at the anode, and a total of one equivalent of H+ ions as well as any combination of migrating bulk media ions, $Fe^{++}$, $Mg^{++}$ or $Co^{++}$, etc., can be immobilized at the cathode.

While the hydrogen ion concentration was high (i.e., the low initial pH) in the polymer composite, most of the cathode reaction involved $H^+$ ions reduced at the cathode and power demand was higher, i.e., 50 ma. However, as the pH rose to a value of about 6, as the result of hydrogen liberation, (and $OH^-$ ion generation) current flow was observed to diminish to approximately 15 ma. Metal ions appeared to codeposit, as hydrogen was evolved, at the cathode in the form of metals. At the same time, migration of $OH^-$ ions away from the electrode was noticeably inhibited by the polymer matrix, which contributed to a pH rise in the polymer, the highest pH being immediately adjacent the cathode. This high Ph caused some of the ions, notably iron, to precipitate in the polymer as hydroxides. The charge neutrality requirement across the bulk electrolyte was ultimately maintained via a counter-ion flow back to the anode, and subsequently with the release of oxygen at the anode. The theoretical current flow under a voltage potential was estimated using the above described relationships and predicted was a current flow of approximately 15 ma for the above described setup for steady-state conditions.

Cleanup of this simulated underground aquifer was the ultimate objective for this apparatus. The aquifer water was modeled after a large aquifer contaminated with various ionic species. (See the composition shown in Table 1).

The 10 volts D.C. applied electropotential represented a scale-up potential of 13.3 volts/meter for this aquifer. The basis for this voltage presumed an electrode spacing of about 15 meters, and an electropotential of 140 volts. The 10 volts D.C. potential was maintained for 160 hours, and water samples were taken after 48 and 160 hours. These water samples were analyzed for the various ionic species. The current was also monitored and its value stabilized at approximately 15 ma through the duration of the test.

In addition to demonstrating cleanup of the ground water, this example permitted observing three controllable parameters which influenced the limiting current demand for this process. (1) Because an ample supply of oxidizable material is necessary at the anode and because the oxidation of water to form oxygen is the most desired, an ample supply of water at the anode is necessary. At ten volts the potential is high enough for water decomposition. The water, therefore, provides an ample supply of electroactive species. (2) Electrodes with large surface area or high efficiency toward the electrode reaction are preferred. This prevents the electrodes from limiting the ion pickup. For this example, a porous graphite cathode (as opposed to bare stainless rod), and an anode with an oxide coating that promoted high efficiency were used. With these variables controlled, the ionic mobility becomes the controlling factor. (It must be assumed that the liquid in the bulk source is stagnant, otherwise diffusion as opposed to ion mobility becomes the controlling factor.) (3) The current becomes dependent upon electrode spacing, applied voltage, and ionic concentration of the aquifer composition.

The following Table provides the ionic concentrations of several species at 0, 48 and 160 hours.

TABLE 1

| | Analysis of Water Samples | | |
|---|---|---|---|
| Element | Concentration At Start (ppm) | Concentration After 48 Hrs. (ppm) | Concentration After 160 Hrs. (ppm) |
| Manganese II | 5.73 | 5.08 | 1.13 |
| Cadmium II | 1.11 | 1.01 | 0.25 |
| Iron III | 6.50 | 0.79 | 0.02 |
| Lead II | 6.93 | 8.83 | 0.12 |

TABLE 1-continued

| | Analysis of Water Samples | | |
|---|---|---|---|
| Element | Concentration At Start (ppm) | Concentration After 48 Hrs. (ppm) | Concentration After 160 Hrs. (ppm) |
| Fluoride | 6.70 | 9.40 | 10.2 |
| Sodium | 279 | 277 | 280 |

EXAMPLE 2

Figure 4:
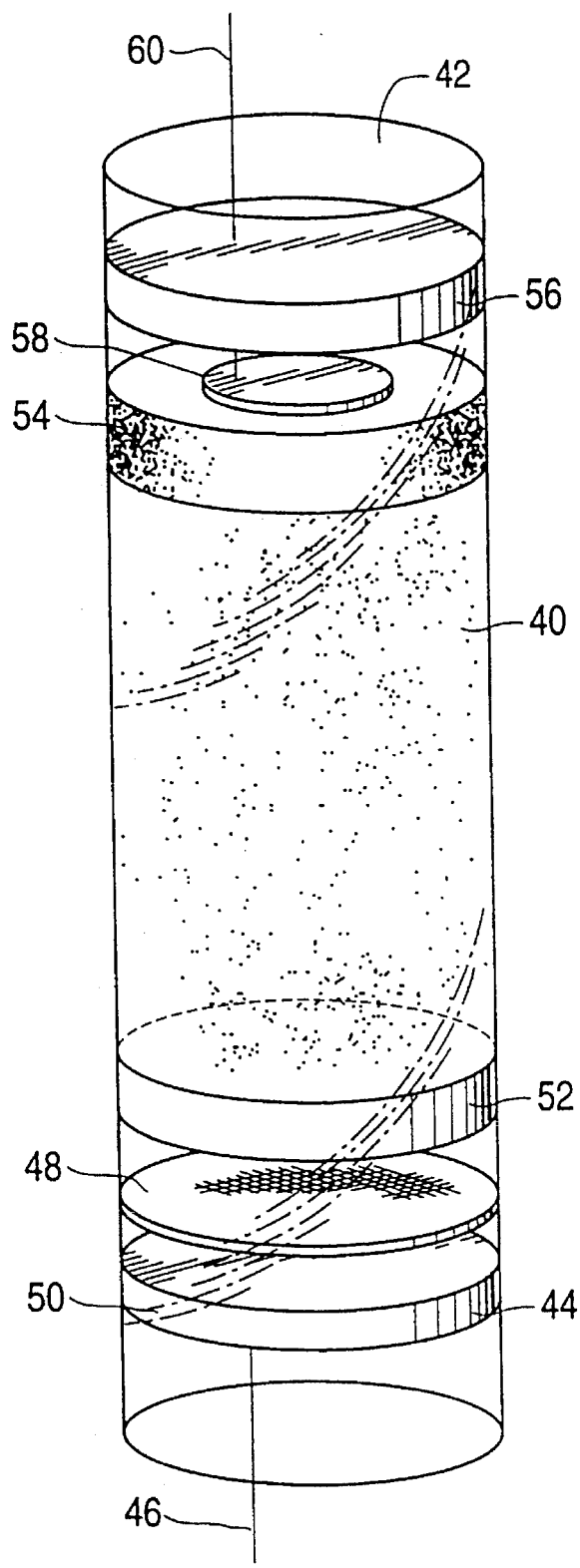
FIG. 4 is a diagram of an electro-extraction cell for remediating contaminated groundwater.

FIG. 4 depicts the laboratory apparatus which was utilized to carry out an electropotential extraction and polymer immobilization process to decontaminate a sample of soil retrieved from a seepage basin of a large industrial complex. The sample consisted of approximately 4,000 grams of naturally dampened soil, whose radiological and toxic metal components are described below.

The soil 40 was placed in a two inch diameter by twenty four inch long plexiglas tube 42. Tube 42 was fitted on the bottom with a loosely fitting plexiglas end cap 44, which was penetrated by an electrical conductor 46. In turn, the conductor 46 was attached to a ruthenium oxide coated titanium screen mesh 48. The connection/junction 50 between electrical conductor 46 and screen mesh 48 was covered by an epoxy sealant, Devcon 12, to prevent destruction by sacrificial corrosion. The anode host receptor matrix 52 consisted of a two layer polymer sandwich, the first layer consisting of an anion exchange resin bead, Rohm & Haas #760, immobilized in a water swellable polyurethane matrix polymer Scotch Seal Chemical Grout 5610 by 3M, and the second layer consisting of an unfilled water swellable polyurethane water gel (Scotch Seal 5610). The top of the laboratory apparatus included a cathode host receptor matrix 54 comprised of a water swellable polyurethane polymer Scotch Seal 5610, filled with a naturally occurring zeolite filler (TSM140 H). See Table 2A below for the polymer composition.

TABLE 2A

| Composition of Host Receptor Matrix | |
|---|---|
| Anode | Cathode |
| D.I Water - 20 grams | D.I. Water - 20 grams |
| Ion Exchange Beads - 15 grams (Strong Base Type) | Zeolite - 15 grams TSM-140H |
| Water Swellable Polyurethane Polymer - 6 grams | Water Swellable Polyurethane Polymer - .6 grams |

The anode polymer was preconditioned by immersion in 0.1 molar nitric acid for 20 hours during which time a D.C. potential of 20 volts was imposed via a stainless steel electrode pressed into the composite. A plastic end cap 56 provided support for a stainless steel cathode 58 pressed into the host receptor matrix 54. Plastic end cap 56 also provided support for stainless steel cathode 58 which was ultimately connected via electrical conductor 60 to a D.C. power supply. Approximately 100 ml of ammonium phosphate fertilizer was added to enhance electrical conductivity. The above described cell was operated at 40 volts D.C. and approximately 1 milliampere current load for a period of 7 days. During this time, distilled water was added to the soil periodically to maintain the soil in a moist state. The water provided a transport medium for the ions. The preremediation soil assay data are presented in Table 2B:

TABLE 2B

Soil Sample Assay Concentration of Metal Ions Before Remediation

| Element | Concentration in P.P.M. |
| --- | --- |
| Calcium | 19.0 |
| Magnesium | 3.7 |
| Manganese | 2.1 |
| Lead | 0.2 |
| Zinc | 2.0 |
| Aluminum | 49.0 |
| Boron | 0.6 |
| Iron | 36.0 |
| Sodium | 5.0 |
| Strontium | 0.13 |
| Titanium | 0.2 |
| Vanadium | 0.6 |
| Phosphorus | 3.1 |
| Silicon | 4.9 |
| Mercury | 0.015 |
| Uranium | 0.03 |

After remediation, an analysis was performed of the soil sample, focusing on the two elements of primary concern from a toxicological standpoint, i.e., mercury and uranium. Mercury and uranium removal was virtually complete, i.e., below instrument detection limits. Analysis of the two polymer composites revealed:

In Anode Polymer

Cadmium
Cobalt
Copper
Magnesium
Iron
Chromium
Mercury
Uranium
Lead

In Cathode Polymer

Manganese
Barium
Sodium
Strontium
Titanium
Aluminum
Calcium

Not Detected in Either Polymer

Zinc
Vanadium
Boron
Phosphorous
Silicon

EXAMPLE 3

Figure 5:
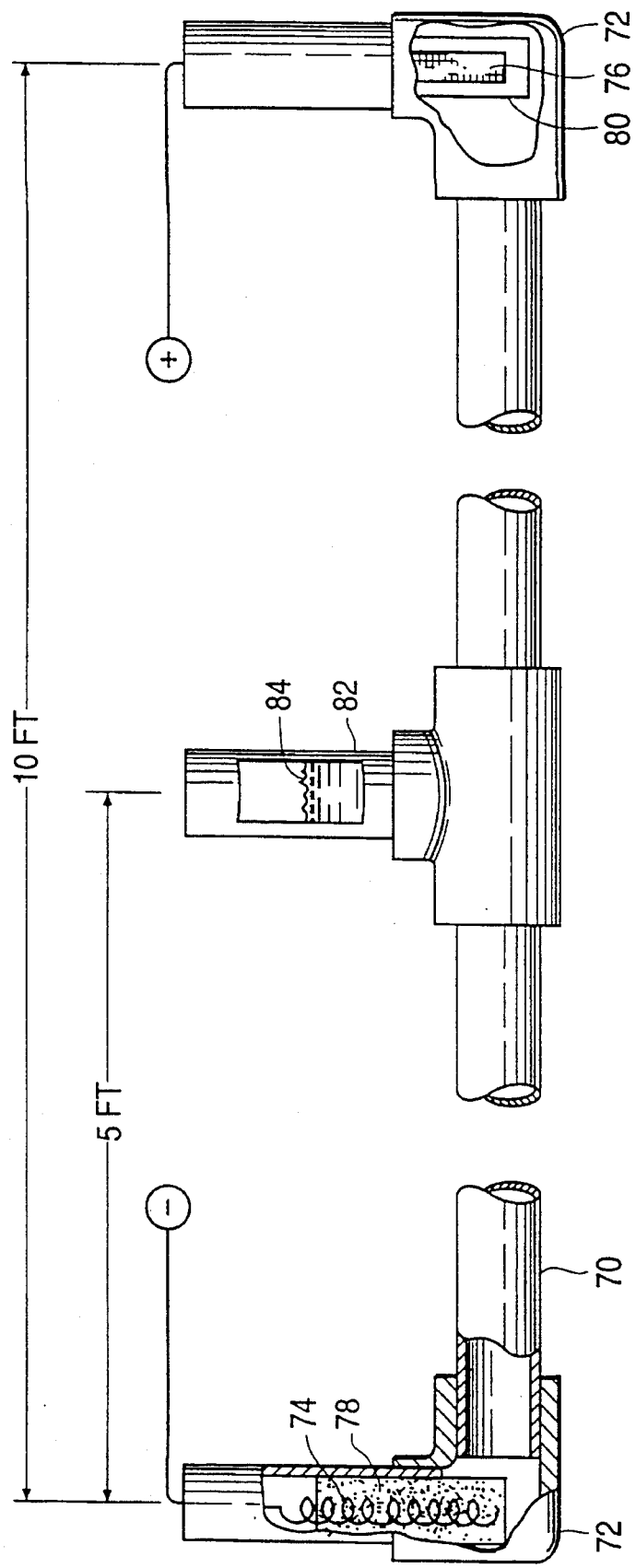
FIG. 5 is a diagram of a laboratory scale apparatus used to conduct electro-extraction heavy metal-containing soil samples.

The ion mobility characteristics, as well as the range of influence of the electropotential-induced ion migration into the immobilizing polymer, was characterized using a specially designed cell shown in FIG. 5. The apparatus was filled with the groundwater solution described in Experiment No. 1. A polyvinyl chloride tubing array 70, approximately 10 ft. long by 1 and ½ inches diameter was provided with fittings 72 to permit introduction of electrodes and introduction of water.

Electrodes consisting of a cathode 74 made of graphite and an anode 76 made of ruthenium oxide (Eltec Corp.) coated titanium were encased in the cathode host receptor matrix 78 and the anode host receptor matrix 80, respectively, as described in Table 3A. A center opening 82 was incorporated to permit optional sampling at this point. The groundwater solution 84 was introduced into the apparatus and the negative pole of a D.C. power supply was connected to the cathode 74 and the positive pole to the anode 76.

TABLE 3A

| Anode HRM Composition | Cathode HRM Composition |
| --- | --- |
| 20 grams D.I. Water | 20 grams D.I. Water |
| 15 grams Strong Acid Resin Bead - Dowex 50 By Dow | 15 grams Syloid Znl (Davidson) |
| 6 grams Scotch Seal 5610 (3M) | 6 grams Scotch Seal (3M) |
| | 5 grams Boric Acid (Aldrich) |

The ionic species studied were characteristic of the ions found in a contaminated aquifer at a large industrial complex. Electrical instrumentation was provided for accurately tracking voltage that had to be applied and the time needed for cleanup for a distant electrode spacing. An attempt was made to predict the rate of transport of ions based on tables of ionic conductance (from the Handbook of Chemistry). It was found that actual ionic mobility differed from the calculated values. Two contributing sources for this discrepancy are believed to be: (1) the existence of the metal ions in complex ionic form; and (2) a threshold change which occurs in transport of the ions due to the use of high voltages (Wien effect). In this instance, both anode and cathode were encased in a water swellable polyurethane matrix incorporating suitable fillers (see table). These were placed in the cell after the addition of the simulated aquifer water, which was a 10 fold concentrate of the normally occurring aquifer water. An electrical potential of sixty volts D.C. was applied to the cell. After 96 hours, a liquid sample was taken at both ends of the cell.

Results from the experiment showed that the ions migrated as expected.

The electrolyte composition before and after the remediation program are described in Table 3B below:

TABLE 3B

| | Water Chemistry Conditions - Simulated Groundwater | |
| --- | --- | --- |
| | Before Treatment PPM | After Treatment PPM |
| Manganese | 58 | 2.58 |
| Cadmium | 1 | .043 |
| Iron | 260 | .591 |
| Lead | 8 | .022 |
| Fluoride | 155 | <5. |

TABLE 3B-continued

Water Chemistry Conditions - Simulated Groundwater

|  | Before Treatment PPM | After Treatment PPM |
|---|---|---|
| Sodium | 1640 | 260. |

EXAMPLE 4

The same laboratory setup described in FIG. 3 of Example 1 was repeated, except that the anode was configured so that the host receptor matrix encased the oxide coated titanium electrode. The composition of this anode polymer was 30 percent by weight of weak base anion exchange resin beads, STIM, 55 percent by weight water, and 15 weight percent of water swellable polyurethane polymer, Scotch Seal 5610. This composite was cast over the metal oxide coated titanium anode mesh which had been formed into a cylindrical rod. The anode polymer host receptor matrix provides a means for immobilizing the anion species, for example, nitrate ion and simultaneously to immobilize any ionic species in the form of anionic complexes. Such anionic complexes are suspected to represent a substantial inventory of metals which are observed in aquifer water. The aquifer water, the power supply and confinement tank were all comparable to Example 1. The cathode polymer host receptor matrix and graphite electrode were similar to Example 1 except that a filler was incorporated into the cathode polymer consisting of a natural zeolite TSM 140 H. The two electrodes were spaced 0.75 meters apart in a container containing 10.1 liters of the synthetic aquifer water. Ten volts were applied for 48 hours and water samples were taken as in Example 1. The results are presented in Table 4 below:

TABLE 4

Analysis of Water Samples

| Element | Concentration At Start (ppm) | Concentration After 20 Hrs. (ppm) | Concentration After 68 Hrs. (ppm) |
|---|---|---|---|
| Manganese II | 4.50 | 4.52 | 1.82 |
| Cadmium II | 0.946 | 0.890 | 0.351 |
| Iron II | 7.67 | 3.13 | 0.08 |
| Lead II | 12.89 | 8.62 | 3.14 |
| Fluoride | 4.70 | 3.38 | 3.77 |
| Chloride | 411.0 | 246.0 | 92.77 |
| Sodium | 238.54 | 222.74 | 46.90 |

EXAMPLE 5

The materials, procedure and equipment of Example 2 were employed except that the anode polymer composite was removed and the entire laboratory apparatus was placed inside a 3500 ml glass beaker.

The clearance of the loosely fitting plexiglas end cap 44 in FIG. 4 permitted the introduction of a fertilizer solution (ammonium phosphate) which would flow past the cathode 58 and into the soil column.

In order to preclude a too-rapid permeation of the fertilizer electrolyte through the soil column, approximately 600 ml of deionized water was added to the annular space between the glass beaker walls and the laboratory apparatus.

The apparatus was filled with a soil classified as a "mixed-water" due to the presence of both EPA classified hazardous components (primarily mercury) and a radioactive complement (primarily uranium). This soil sample had been excavated from a contaminated landfill operated by a large industrial complex.

The analysis of the untreated soil in PPM was as shown in Table 5A:

TABLE 5A

| Mercury | 1000 PPM |
|---|---|
| Uranium | 160 PPM |
| Barium | 20 PPM |
| Copper | Not reported |
| Magnesium | Not reported |
| Nickel | Not reported |

Prior to addition of approximately 2000 grams soil to the laboratory apparatus, the soil was pre-dampened with 125 ml of ammonium phosphate fertilizer solution (ammonium phosphate simulated fertilizer solution obtained from Aldrich Chemical as Ammonium phosphate dibasic). The cathode polymer, cathode and plexiglas end fitting were installed and an additional 125 ml of fertilizer solution were added to the space above the cathode and allowed to leak past the end cap and into the soil cylinder.

An electropotential of 50 volts D.C. caused a 190 ma current flow in the cell. After 2 hours of operation, an additional 200 ml of fertilizer solution was added via leakage through the plexiglas end fitting, and voltage was reduced to 4 volts D.C., with corresponding current flow of 5 milliamperes. This electropotential was maintained for 12 hours.

At the end of this period, the water surrounding the anode portion of the cell was observed to have taken on a distinct light blue coloration.

Analysis of the water from this region of the cell was as shown in Table 5B:

TABLE 5B

| Mercury | 32 PPM |
|---|---|
| Uranium | 4 PPM |
| Copper | 44 PPM |
| Barium | 3.8 PPM |
| Nickel | 1.5 PPM |

The migration of these species of normally cationic metals toward the anode would not be expected unless one takes into account that anionic complexes are likely to be encountered. Such formation becomes especially prevalent with the phosphate electrolyte solution being present.

Those experienced in soil decontamination will recognize that this extraction technique is more effective than a soil washing or chemical extraction process, which depends solely on diffusion kinetics. For comparison, a similar quantity of soil was exposed to the same electrolyte chemistry, but with no electropotentials. At the end of the 14 hour contact time, there was no perceptible color change in the bulk liquid.

EXAMPLE 6

Example 6 provides a comparison of the relative effectiveness of the electropotential migration and polymer immobilization of the present invention versus conventional diffusion. The difference is illustrated by comparing uptake of identical weights of ion immobilizing media under four different conditions.

This example utilized a nuclear grade mixed bed ion exchange bead of a type routinely used in industrial service supplied by Rohm & Haas (XE 604). Four 300 ml beakers were cleaned and each was filled with 200 ml of a 0.05 molar solution of cobalt nitrate. Each test incorporated the same mass of ion exchange media (6 grams). In each case, the bead was placed in contact with the bulk cobalt nitrate solution, via a different mechanism. In the first instance, the bead was cast into a cylindrical form wherein the bead was immobilized using a mass polymer consisting of a water swellable polyurethane polymer Scotch Seal 5610. The approximate dimensions of this cylinder were 3/4 inch diameter by 2 inch length. In the second instance, the matrix ion exchange media and mass polymer media were similar in composition and geometry to the first except the center of the composite (HRM) was hollowed and filled with a buffering solution consisting of approximately 5 ml of a 10 percent acetic acid solution. For the third test setup, the resin bead was confined within a porous melt blown polypropylene mass polymer matrix whose dimension was also approximately 3/4 inch diameter by 21 inches long. In the fourth test setup, the ion exchange bead was not confined nor was it encompassing an electrode, but was instead poured into the liquid containing beaker. A graphite electrode was inserted in the center of each of the cylindrical arrays of the above three described HRM composites. The cylindrical electrode/HRM arrays were placed in containers previously filled with the cobalt solution. A counter electrode of ruthenium oxide coated titanium mesh was positioned 2 inches from the HRM. A potential of 10 volts was applied for 20 hours. At the end of the contact period, the four solutions were analyzed for cobalt and their results are listed below in Table 6:

and electrode dries out. Additional drying of the overall composite results from a competing water-absorption by the resin beads. As a second observation, it was apparent that, in any application involving heavy metal or radionuclide metal scavenging, the more accepted sample would be the buffered HRM (as opposed to porous polypropylene) because of the diminished chance of leaching of removed products back into the cleansed solution.

EXAMPLE 7

Figure 6:
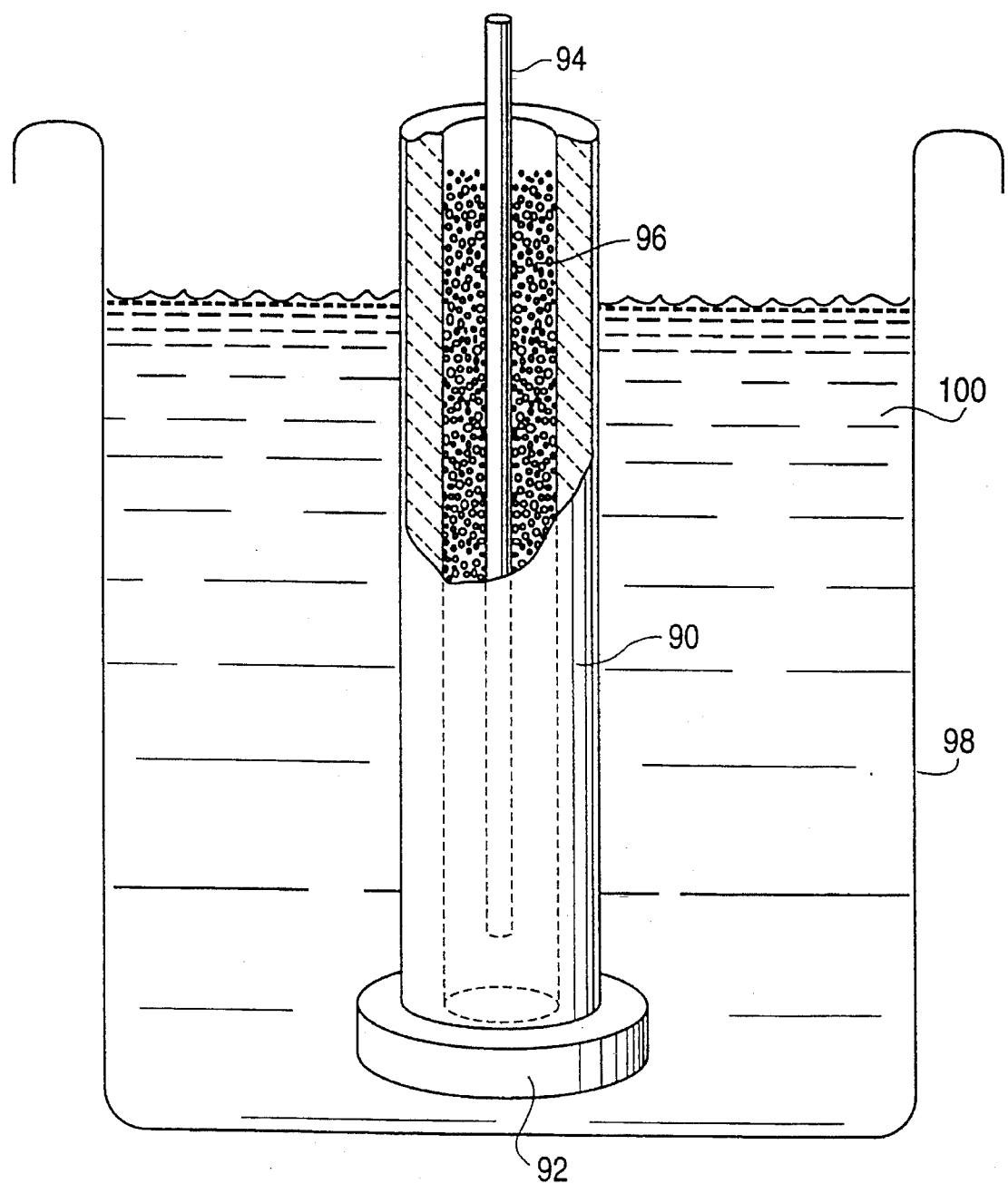
FIG. 6 is a diagram of a laboratory scale apparatus used for in-situ groundwater remediation.

FIG. 6 depicts a laboratory scale model of an apparatus to be used for in-situ ground water remediation consisting of a host receptor matrix where the mass polymer consists of an inorganic polymer bound ceramic matrix 90 consisting of metal oxides, primarily alpha-alumina filled porous media having a nominal pore size of 1000 angstroms. Ceramic matrix 90 was a tubular element of 7/16 inch diameter with 1/16 inch wall thickness cut to a 3 inch length and the bottom was end sealed with a two part epoxy casting end cap 92. When epoxy end cap 92 was sufficiently hardened, a 1/3 inch diameter stainless steel electrode 94 was positioned in the center of ceramic matrix 90 and a mixed bed ion exchange media 96 (a nuclear grade resin available from Continental Water Systems, Metairie, La.) was poured into the annulus. The anode consisted of a ruthenium oxide coated titanium mesh. The laboratory apparatus was placed inside a 300 ml glass beaker 98 which was in turn filled with 200 ml of 0.05 molar cobalt nitrate solution 100.

Five milliliters of a one percent solution of acetic acid in deionized water was added to the annulus area of the bead-filled ceramic cylinder, and an electropotential of 10 volts D.C. was maintained for 20 hours. At the completion of this interval, test of the bulk solution showed a cobalt depletion of approximately 0.010 grams.

TABLE 6

| Run # | No. of Grams of Ion Exchange Bead | Composite Wt. Mass Polymer & Water Ion Exchange Bead | No. of Grams Cobalt Extracted | Voltage D.C. | Type of Mass Polymer |
| --- | --- | --- | --- | --- | --- |
| 1 | 6 | 16.4 | 0.099 | 10V | Polyurethane |
| 2 | 6 | 16.8 | 0.239 | 10V | Polyurethane with Acid Electrolyte |
| 3 | 6 | 9 | 0.287 | 10V | Melt blown Polypropylene Fiber |
| 4 | 6 | 6 | 0.155 | N/A | None |

The test setup incorporating the porous polypropylene mass polymer and electropotential induced ion migration had the best cobalt removal. The buffered cell also performed better than the free resin bead. From these results, it was apparent that the electro-extraction process provided more effective ion capture than did normal diffusion into an ion exchange resin bead.

The relatively poor performance in Run #1 illustrates a kinetics phenomenon which should be avoided in designing an effective decontamination cell. Such an arrangement tends to result in depletion of the ion transporting water electrolyte at or near the electrode surface, compromising the electro-reduction reaction and consequently the ingress of ions into the polymer. This phenomenon is believed to be related to a high resistance to ion transmission which brings about a breakdown, or electrolytic decomposition, of water. Hydrogen is evolved and the interface between the polymer In a repeat of the above cycle, all of the test parameters remained the same, except that the bead type ion exchange was replaced with a liquid polystyrene sulfonic acid polymer electrolyte, molecular weight approximately 5,000.

The ceramic matrix 90 confined the liquid polymer electrolyte with no observed leakage. After 20 hours of operation at 10 volts D.C., a sample of the bulk solution showed a cobalt depletion of 0.130 grams.

EXAMPLE 8

In this example, structural integrity, dimensional stability and enhanced ion transmission rates were achieved by using an open cell glass foam receptor matrix to provide the structural host in the HRM composite.

Figure 7:
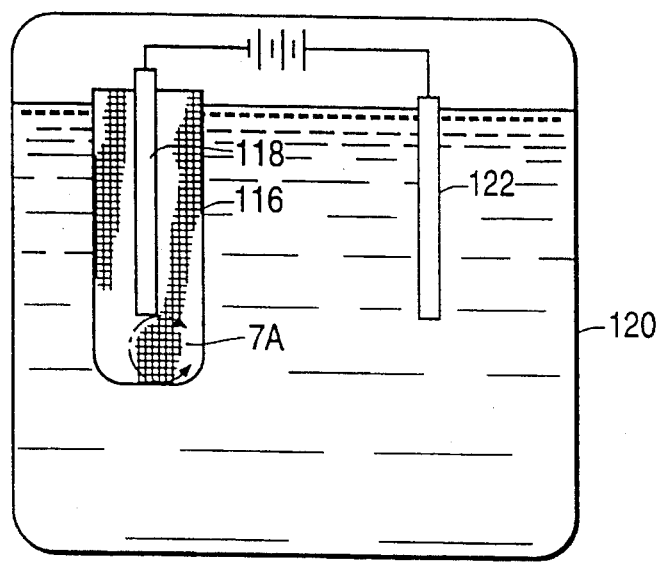
FIG. 7 and FIG. 7A illustrate an electro-extraction cell utilizing a ceramic foam host receptor matrix.
Figure 7A:
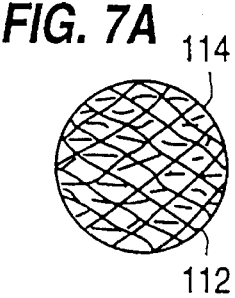

Referring to FIGS. 7 and 7A, a 2"×2"×6" open cell glass foam briquette (manufactured by Bioglas, Inc., San Antonio, Tex.) was immersed in a two percent solution of polyisoprene latex and allowed to remain immersed overnight to ensure a thorough impregnation of the foam pores. The impregnated glass foam was then dried by placing it in a warm circulating air oven overnight. Microscopic examination of the dried composite showed that the composite had retained its open pore structure, yet the glass surface 112 was uniformly covered with the polyisoprene polymer 114.

The composite was subsequently placed inside a desiccator, the bottom of which was covered with fuming sulfuric acid. The desiccator was kept sealed for 24 hours whereupon the $SO_3$ vapors reacted with the unsaturation sites of the polyisoprene polymer, converting them to sulfonate groups.

At the end of the vapor contact period, the composite was rinsed with deionized water to remove any leachable impurities. The resulting glass foam/polymer electrolyte composite was then utilized as the host receptor matrix 116.

A carbon rod electrode 118 was inserted into the glass foam/polymer electrolyte host receptor matrix 116. This device was then immersed in a water solution 120 which contained the following concentration (in ppm) of metal ions in solution:

| Metal Ions | Concentration |
|---|---|
| Mn++ | 58 |
| Cd++ | 1 |
| Pb++ | 8 |
| Fe++ | 260 |
| Na+ | 1640 |
| F– | 155 |

An anode 122 consisting of a ruthenium oxide coated rod was placed in contact with the water solution 120, and the two electrodes operated at an impressed electropotential of 10 volts D.C.

At the end of 72 hours of operation, iron was found to have collected in the cathode host receptor matrix 116. The absence of precipitation outside of the HRM 116 demonstrated that the occlusion effect of the OH– ions was minimized by the acid buffer adjacent to the cathode. The acid buffer consumed the hydroxyl anions generated at the cathode and as a result the pH gradient across the polymer was reduced and the cobalt ions were able to penetrate deep into the polymer matrix. The expected deterioration of the cathode polymer was limited to the area adjacent to electrode 118 due to the high pH generated by the cathode reaction.

EXAMPLE 9

The technique for protecting the metal anode electrode with an electrically conductive polymer layer was demonstrated by means of two ion extraction cells.

These cells were similar except that one cell incorporated a 2 layer polymer HRM, with an inner layer of electrically conductive carbon-filled polymer in contact with the anode. The function of this electrically conductive layer was to displace the electrochemical reactions, which would normally be expected at the anode surface, to a location far enough away from the stainless steel electrode such that the sacrificial attack was minimized. The experiment was carried out as follows:

Cell Design:
All electrodes—Stainless Steel
Voltage—20 V D.C.
Both cells were operated at: 20 Volts D.C. Current demand: 100 Milliamperes (Control)
80 Milliamperes (Conductive Polymer)
No cathode HRM was used.

Control:
For the anode HRM, 30 g of deionized water was mixed with 5 g of water swellable polyurethane polymer (Scotch Seal 5610). Into this polymer was inserted a stainless steel rod. This anode functioned as the "control setup."

Conductive Polymer:
In the other setup, the HRM polymer consisting of 30 g of deionized water mixed with 5 g of water swellable polyurethane polymer Scotch Seal 5610 was hollowed in the center, and this was filled with the following formulation:

| | |
|---|---|
| 20 grams | D.I. Water |
| 15 grams | Graphite Fiber |
| 5 grams | Water Swellable Polyurethane polymer |

Into the center was inserted a stainless steel rod. In both instances, the extraction cells used 200 ml of a 0.01 molar solution of sodium chloride.

Observations:
At the end of 3 hours of cell operation, the stainless steel anode elements were removed from the test setup and examined. The control anode was observed to have decomposed completely, thus filling the HRM with corrosion products. The sample containing the inner layer of electrically conductive graphite filled polymer displayed no corrosion of the stainless steel rod. It was apparent, therefore, that the additional power demand of the control anode was caused by the corrosion of the metal.

Examples 10–13, and corresponding FIGS. 10–13 provide cross sectional views of four demonstration scale electrokinetic decontamination cells, which illustrate the optimization of power consumption during decontamination. The potential effect of the chemistry surrounding the electrode element can be appreciated by referring to equations which are presented below for calculating the total current demand. A summary of the electrodes and experimental parameter for the cells in Examples 10–13 are provided in Tables 10A and 10B.

TABLE 10A

Figure 10:
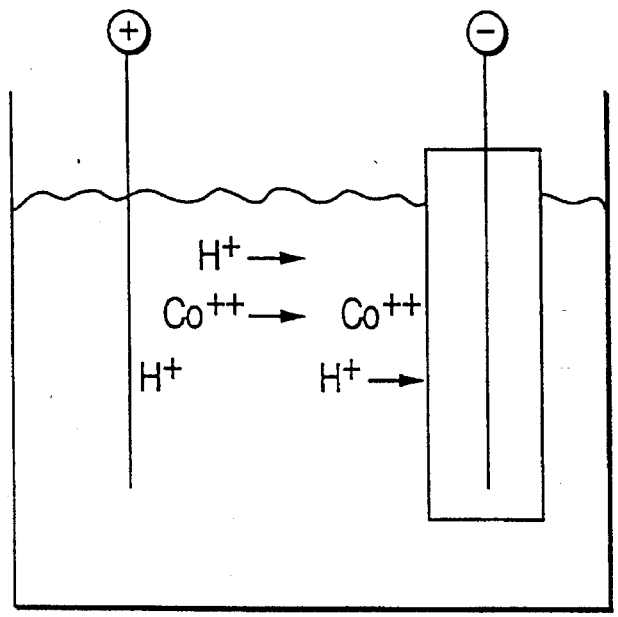
FIGS. 10–13 illustrate a series of electro-extraction cells which illustrate the ability of this process to optimize the electrical power demand.
Figure 11:
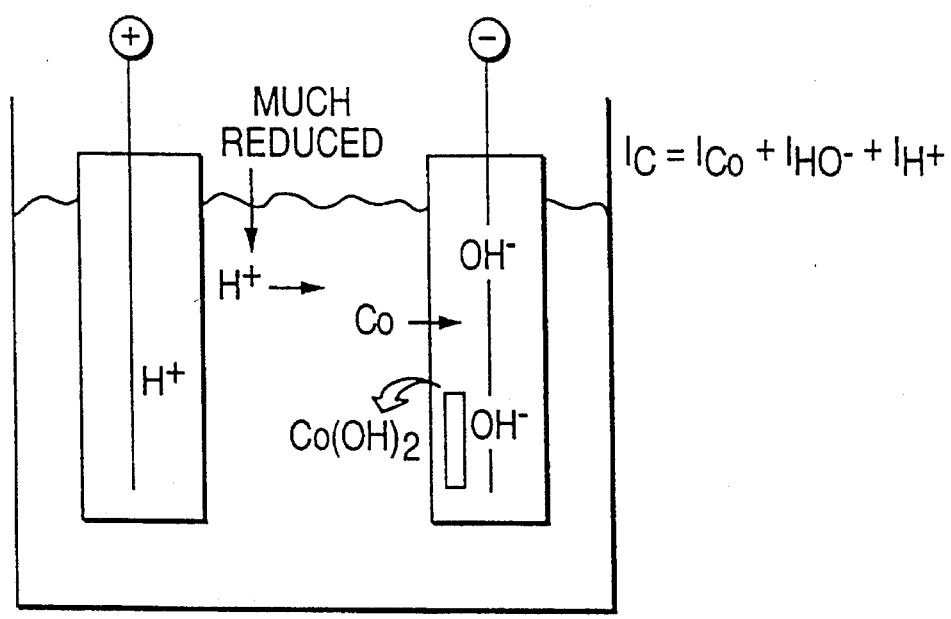
Figure 12:
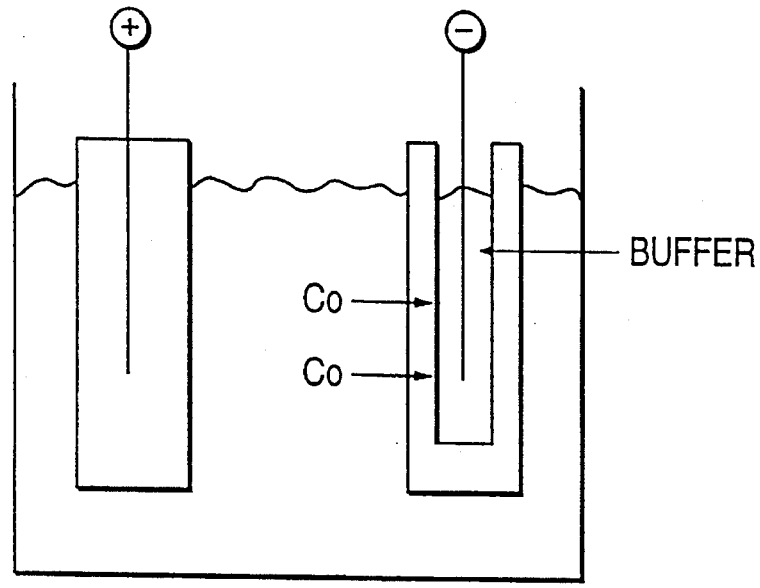
Figure 13:
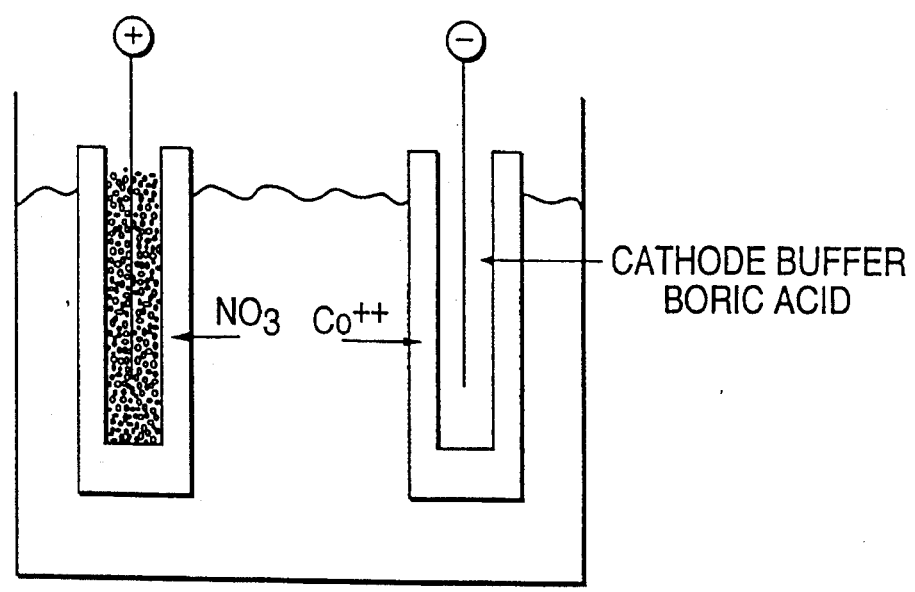

| Figure No. | Composition of Electrodes | |
|---|---|---|
| | Anode | Cathode |
| 10 | None | Polymer consisting of 65% DI water, 25% zeolite filler and 10% polymer |
| 11 | Unfilled polymer containing 85% DI water and 15% polymer | Same as cathode in FIG. 10 |
| 12 | Same as anode in FIG. 11 | Same as cathode in FIG. 10 except center buffered with boric acid |
| 13 | Same as anode in FIG. 11 except center buffered with strong base anion beads | Same as FIG. 12 |

TABLE 10B

Experimental Parameters
All Examples

| Solution: | 500 ml - 0.5 molar cobalt |
|---|---|
| nitrate | |
| Electrodes: | |
| Titanium Rod | Anode = Precious Metal Coated |
| Rod | Cathode = Stainless Steel |
| Volt/cm | Applied Voltage = 1 |
| Run Time: | 24 Hours |

The objective of this experiment is to illustrate the ability of an HRM to mitigate against the release of either $H^+$ ion or $OH^-$ ion into the soil or groundwater. As stated above, these ionic species are undesirable from a power consumption viewpoint. The $H^+$ ion, which is liberated at the anode, is a very highly mobile (high velocity) charge transport mechanism that can account for a large power demand. If the $H^+$ ion is reacted at the electrode and exchanged for a lower velocity cation, the result is a significantly lower demand in power consumption.

EXAMPLE 10

In the cell depicted in FIG. 10, the anode is bare and the cathode polymer is essentially inert. The cathode polymer was constructed by mixing 20 parts of a synthetic zeolite Syloid Znl with 65 parts deionized water and 15 parts of the urethane polymer Scotch seal 5610. The polymer was cast into a plastic mold into a cylindrical form. A stainless steel cathode was inserted into the center of the polymer.
Observations:

Generation of $H^+$ ion causes competition for removal at cathode. As the concentration of $Co^{++}$ decreases and $H^+$ ion increases, a greater percentage of the current is carried by the $H^+$ ion.

EXAMPLE 11

The cathode used in this Example was the same as that used in Example 10. The anode polymer was constructed by mixing 85 parts deionized water with 15 parts Scotch seal chemical grout and casting the mix into a plastic mold with a 0.5 inch diameter and a 2 inch length.
Observations:

The use of the unfilled anode polymer at the anode provides a modest degree of buffering effect of the anode $H^+$ generation reaction. Though this buffering enhances the Co contribution to the current demand, it causes other problems. Generation of $OH^-$ at the cathode hinders flow of the Co ion into the polymer in two ways; first by decreasing the contribution of the Co to the current in the cathode polymer, and secondly, by causing precipitation of the Co as $CO(OH)_2$. This precipitation clogs the interstices of the cathode polymer especially near the surface and causes some precipitation at the surface of the polymer. Though the Co removal is greater than that of FIG. 10, some of this removal is due to the precipitation.

EXAMPLE 12

In Example 12, the anode and cathode were the same as those used in Example 11, except the center of the cathode was buffered with boric acid.
Observations:

The use of a buffer (boric acid) at the cathode enhances the ability of the cathode polymer to recover the cobalt, and to have a deeper penetration of the cobalt into the polymer. The following mechanism is observed: the $OH^-$ is neutralized by the boric acid, thus current carried through the polymer is almost exclusively related to the cobalt ion migration. $I_C \cong I_{Co} + I_{H+}$ and a small portion of the current is due to the gradually generated $H^+$ ion.

EXAMPLE 13

The cathode in this Example was the same as in Example 12. The anode was similar to that of Example 12, except the center was buffered with strong base resin YE32.
Observations:

By using a buffer at the anode polymer, the $H^+$ generated ion is eliminated, and in 24 hours, 89% of the cobalt is removed. However, buffering of the cathode polymer must be used in conjunction with the buffering of the anode. Otherwise, precipitation of the cobalt outside the cathode polymer occurs. In soil, there is very little mixing of interstitial water and, therefore, the effect of the $H^+$ ion on metal recovery is even more pronounced. In the soil, the current is dependent upon the ionic mobility and the $H^+$ ion has a much greater mobility, an average 7 times greater than the contaminant ions.

The cobalt extraction efficiencies of the cells in Examples 10-13 are summarized in Table 11.

TABLE 11

Cobalt Extraction Efficiency

| Example 10 | 20% |
|---|---|
| Example 11 | 65% |
| Example 12 | 704 |
| Example 13 | 89% |

EXAMPLE 14

Example 14 illustrates electrokinetic decontamination process which incorporates a host receptor membrane comprised of porous PTFE. The porous PTFE film consists of 0.0015 thick (0.22 micron) polytetrafluoroethylene membrane laminated to a 15 ounce felt backing fabric. The membrane is commercially available under the name Gore® and is manufactured by Tetratec Corporation.

The membrane was supplied as a sheet, approximately 30 inches by 30 inches, and was supported on its entire perimeter in a non conductive framework in a manner which provided a liquid reservoir in the region below the porous PTFE membrane. An impermeable polyethylene film provided the barrier to leakage of anolyte liquid from the area surrounding the anode. The liquid used in the anode compartment in this instance is 15% ammonium hydroxide. The anode was placed inside the thus formed anolyte reservoir, and electrical leads routed through sealant pathways to a D.C. power supply.

A polymer membrane was placed above the porous PTFE membrane. This polymer membrane consisted of 12 percent Scotch Seal 5610 polymer and 88 percent water. Above the polymer membrane was placed a five inch thick layer of uranium contaminated soil.

The cathode consisted of a mild carbon steel wire mesh which rested on the upper surface of the soil. Above this steel mesh was placed a porous hose which is commercially available. A catholyte solution consisting of 0.1 molar ammonium carbonate, 0.2 molar ammonium bicarbonate, 0.05 molar ammonium citrate dibasic was delivered to the soil/electrode region via the porous hose.

A D.C. electropotential of 1 volt/cm was maintained between the anode and cathode (current flux 0.65 ma/cm$^2$ amps per square foot). At the end of 247 hours, the cell was disassembled and the soil was tested for uranium removal. Average removal was 57%.

EXAMPLE 15

The importance of choosing the correct leach solution to the electrokinetic process is illustrated in this example. In this example, four Leach solutions were compared for their ability to remove uranium from a carbonaceous soil Solution 1 consisted of deionized water and hydroxyl ions generated at the cathode.

Solution 2 consisted of a 0.02 molar DTPA solution and hydroxyl ions generated at the cathode.

Solution 3 consisted of a 0.2 molar solution of ammonium citrate and citrate anions generated at the cathode.

Solution 4 consisted of a 0.2 molar ammonium bicarbonate a 0.1 molar ammonium carbonate solution and carbonate anions generated at the cathode.

Oval shaped HRMs with dimensions of 9 cm length, 4.5 cm width, and 5 cm height were constructed using the following procedure (see). The cathode polymers consisted of 85% water and 15% polymer (Chemical Grout 5610). The anode polymers consisted of a mixture of 60% water 30% hydrated alumina, and 10% of the 5610 Chemical Grout. Each of the polymers contained a buffer chamber in their center which in the case of the anode polymers was filled with a 60% solution of the polyethyleneimine (SP 018 by Aceto Corp.). The imine served two purposes.

First the imine neutralizes the hydrogen ion generated in the anode reaction forming charged sites along the backbone of this polymer. These sites now become available to remove any uranium anion complexes which have penetrated the outer polymer. Secondly, because the polyethylene imine is a large compound, very little of the current flux at the anode is from inside the polymer to the soil. Consequently, the majority of the current is a result of contaminants from the soil moving into the anode polymer.

For test 1 and 2 the cathode polymers contained a 20% solution of ammonium hydroxide. For test 3 the chamber was filled with a 20% of citric acid. The citric acid buffered the generation of hydroxide ion formed as a result of the cathode reaction. The citrate anions then proceeded to flow out of the cathode polymer. For test 3 the chamber was filled with a 20% solution of ammonium bicarbonate. Though this material is already basic, the bicarbonate ions buffered the generation of hydroxide ions at the cathode, forming carbonate anions which proceeded to flow into the soil toward the anode.

The soil used in the test was 900 grams of soil containing 160 ppm uranium. The applied potential was 1 volt/cm and the distance between the electrodes was 20 cm (FIG. 15A). The test was run for 160 hours with the addition of 50 ml of the leach solutions every 24 hours. After the test both the anode and cathode polymer matrices were analyzed for uranium uptake (see FIG. 16).

The results from the test, illustrated in FIG. 16, reveal that the citrate solution was far superior to the other solutions. The second solution was the carbonate solution and the removal from test 1 and 2 were much lower. From the results, it was also evident that where good removal did occur, most of the uranium migrated toward the anode. The hydrated alumina was found to perform fairly as a filler for the anode polymers, however complete absorption of the uranium did not occur in the polymer and some of the uranium was found in the anode buffer. The unfilled cathode polymer was found to perform well as a permeable polymer which would allow migration of the leach ions into the soil. In the case of tests 3 and 4, the cathode buffers performed well at controlling the generation of hydroxyl ions at the cathode. In neither case did the pH in the soil adjacent to the polymer rise above its starting value.

EXAMPLE 16

This prophetic example involves the removal of sulfate anions from soil or groundwater. In this example, the anode HRM consists of a cylinder of a teflon coated membrane (Gore fabric) having two acrylic endcaps. The membrane allows only water and ions to pass under an electrical field and not diffusion. The cylinder is filled with a mixture of a strong base anion exchange resin, e.g., YE32 by Rohm & Haas, and water. Into the center of the cylinder is placed an iridium oxide coated titanium electrode.

The exchange sites on the resin contain hydroxyl ions which buffer the generation of hydrogen ions as a result of the anode reaction and produce charged sites for the pickup of the sulfate ions (FIG. 17A). Alternatively, the anion resin may be converted to the chloride by washing the resin with 2 molar hydrochloric acid. The anode reaction in this case is the oxidation of the chloride ions to chlorine gas. A ruthenium oxide coated titanium electrode would be used to optimize efficiency (FIG. 17B).

The cathode may consist of a bare steel rod or, more preferably, a cylinder like that used for the anode. In the case of the cathode, however, the cylinder would be filled with a strong acid cation exchange resin. The resin would buffer the generation of hydroxide ions at the cathode and would pick up contaminant cations from the soil. A steel or graphite electrode would be used.

The constructed electrodes would be placed into the soil in vertical arrays with as many as 10 cylinders stacked on top of each other. More preferably, a total of 5 cylinders would be stacked together for logistical reasons. The applied potential and electrode spacing would be determined by the soil, the desired cleanup time and the allowable voltage for safety reasons.

It will be apparent to those skilled in the art that various modifications and variations can be made to the HRMs, apparatuses and processes of this invention. Thus, it is intended that the present invention cover the modifications and variations provided they come within the scope of the appended claims and their equivalents. For example, copending U.S. application Ser. No. 07/683,973, filed Apr. 8, 1991, the disclosure of which is expressly incorporated herein, describes methods which use wave energy (e.g., microwaves, radio waves, sonic and ultrasonic waves, etc.) to effect or enhance the dissociation of ionic species from a soil matrix. Such methods of using wave energy can be employed simultaneously or in conjunction with (either before or after) any of the HRMs, processes and apparatuses discussed herein. Depending upon the particular conditions encountered, the use of such wave energy may enhance the transport and capture of target ions as disclosed herein.

What is claimed is:

1. An apparatus useful for electrochemically removing a target ion from a bulk source, said apparatus comprising:

an electrode;

a containment surrounding said electrode, said containment being ion permeable and water impermeable, a composition located within said containment that substantially prevents or inhibits the migration away from said containment of hydrogen or hydroxyl ions produced at said electrode.

2. An apparatus according to claim 1, wherein said containment comprises a material which has a low surface energy.

3. An apparatus according to claim 1, wherein said containment comprises polytetrafluoroethylene film.

4. An apparatus according to claim 1, wherein said apparatus comprises a substance that immobilizes and/or confines said target ion, and wherein, said substance that immobilizes or confines said target ion may be the same as, or different from, the composition located within said containment that substantially prevents or inhibits the migration away from said containment of hydrogen or hydroxyl ions produced at said electrode.

5. An apparatus according to claim 4, wherein said substance comprises a liquid located within the containment which can contain said target ion.

6. An apparatus according to claim 4, wherein said substance comprises a solid composition which can immobilize and/or contain said target ion.

7. An apparatus according to claim 4, wherein said composition that substantially prevents or inhibits the migration away from said containment of hydrogen or hydroxyl ions produced at said electrode comprises an ionizable species which will dissociate during application of an electropotential gradient, and said dissociation results in the release of a monovalent or multivalent exchange ion into the bulk source.

8. An apparatus according to claim 7, wherein said electrode is an anode and said exchange ion is less mobile in the bulk source than a hydrogen ($H^+$) ion.

9. An apparatus according to claim 8, wherein said ionizable species is a metal hydroxide.

10. An apparatus according to claim 7, wherein said electrode is a cathode and said exchange ion is less mobile in the bulk source than a hydroxyl ($OH^-$) ion.

11. An apparatus according to claim 10, wherein said ionizable species is an organic or inorganic acid.

12. An apparatus according to claim 7, wherein said containment comprises a mass polymer which provides structural integrity and an ion conductive polymer having pendant ion exchange sites.

13. An apparatus according to claim 4, wherein said composition that substantially prevents or inhibits the migration away from said containment of hydrogen or hydroxyl ions produced at said electrode comprises an ionizable species which at least partially buffers hydrogen ($H^+$) ions or hydroxyl ($OH^-$) ions generated at the electrode, thereby preventing or lessening a change in pH in the vicinity of the electrode.

14. An apparatus according to claim 13, wherein said ionizable species is selected from the group consisting of ammonium hydroxide, citric acid, and DTPA.

15. An apparatus according to claim 1, wherein said containment comprises at least two layers, wherein each layer is comprised of a different composition.

* * * * *